United States Patent [19]

Ellsworth et al.

[11] Patent Number: 4,620,278
[45] Date of Patent: Oct. 28, 1986

[54] DISTRIBUTED BUS ARBITRATION ACCORDING EACH BUS USER THE ABILITY TO INHIBIT ALL NEW REQUESTS TO ARBITRATE THE BUS, OR TO CANCEL ITS OWN PENDING REQUEST, AND ACCORDING THE HIGHEST PRIORITY USER THE ABILITY TO STOP THE BUS

[75] Inventors: James G. Ellsworth; Thomas E. Wulling, both of St. Paul, Minn.

[73] Assignee: Sperry Corporation, New York, N.Y.

[21] Appl. No.: 527,063

[22] Filed: Aug. 29, 1983

[51] Int. Cl.⁴ .............................................. G06F 13/36
[52] U.S. Cl. .................................................... 364/200
[58] Field of Search ... 364/200 MS File, 900 MS File

[56] References Cited

U.S. PATENT DOCUMENTS

| 4,275,095 | 3/1981 | Nadir | 364/200 |
| 4,373,183 | 2/1983 | Means et al. | 364/200 |
| 4,374,413 | 2/1983 | Comfort et al. | 364/200 |
| 4,449,183 | 5/1984 | Flahive et al. | 364/200 |
| 4,453,215 | 6/1984 | Reid | 364/200 |
| 4,463,445 | 7/1984 | Grimes | 364/900 |
| 4,536,839 | 8/1985 | Shah et al. | 364/200 |

*Primary Examiner*—Thomas M. Heckler
*Attorney, Agent, or Firm*—Glenn W. Bowen

[57] ABSTRACT

A digital communication bus upon which arbitration is distributed in a multiplicity of communicable interconnected bus interface logics supports unique signals to each associated on user device and upon the bus. Arbitration inhibiting signals, called inhibit request signals, allow any one(s) user device(s) to inhibit the new entrance, via requests, into arbitration of all other bus interconnected bus interface logics and associated user devices. Arbitration among bus interface logics already registering requests continues in priority order. Each user device may, via a signal called retract request, deregister, or cancel, requests previously registered at the associated bus interface logics to arbitrate for ownership of the bus. Each user device may, via a signal called stop bus, cause continuous interface logics while being precluded from recognition that arbitration should ever be won. When the highest priority one user device so exercises the signal stop bus, then its associated bus interface logics always wins arbitrated ownership of the bus, but naught is known by, or done with, any user device of such ownership; effectively meaning the bus is stopped of normal data communication. Any bus-owning user device may communicate a signal, called priority disable, to the associated bus interface logic and upon a dedicated line of the bus, which signal, called priority disable, to the associated bus interface logic and upon a dedicated line of the bus, which signal postpones the recognition of the winning of arbitration in order that the current bus-owning user may longer retain ownership. Any particular bus interface logics may be, responsively to the setting of a flip-flop called the bus enable flip-flop by any external agency such as any User device or maintenance processor, disabled of any bus activity whatsoever, locking out the associated user device.

12 Claims, 10 Drawing Figures

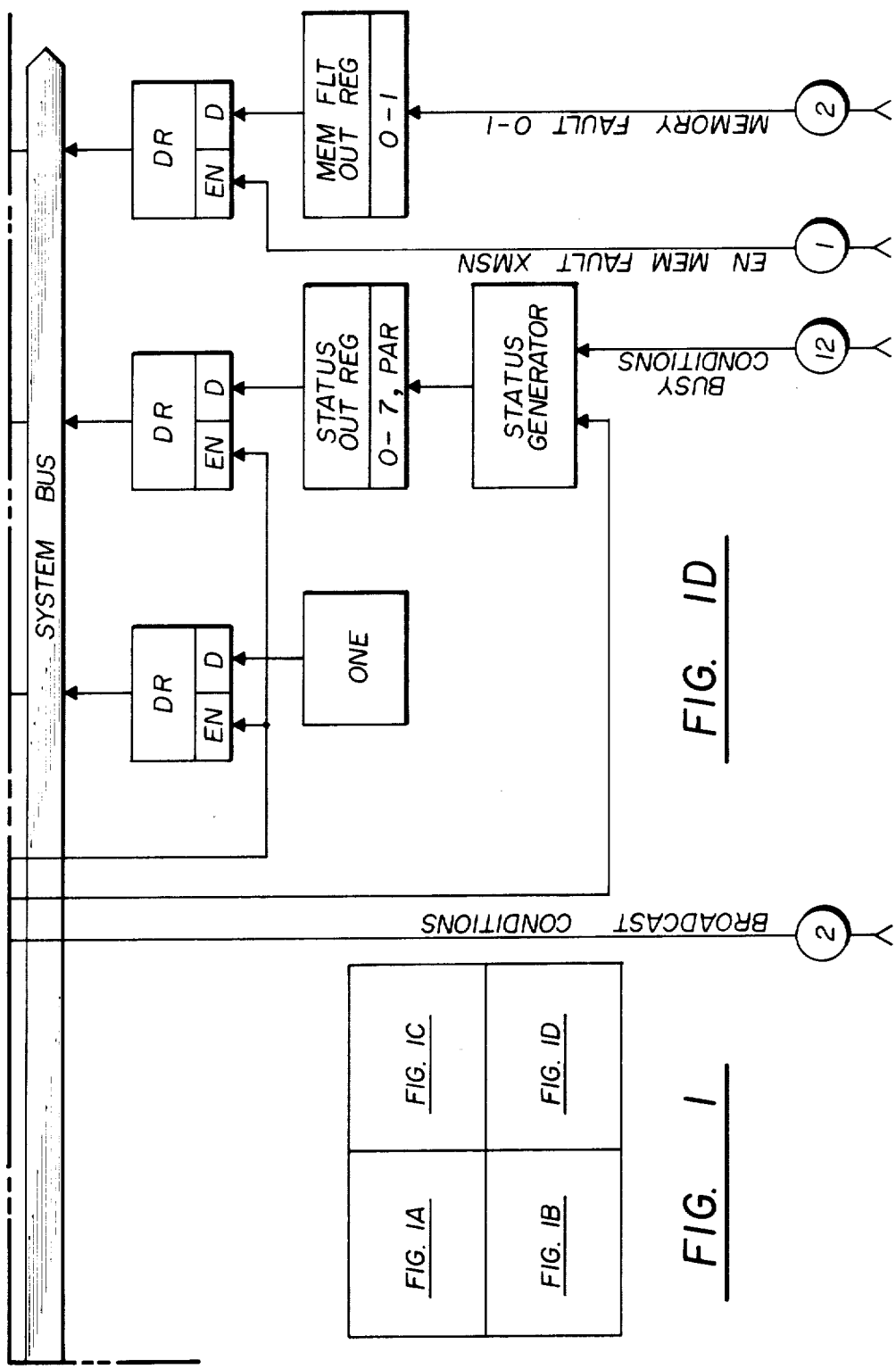

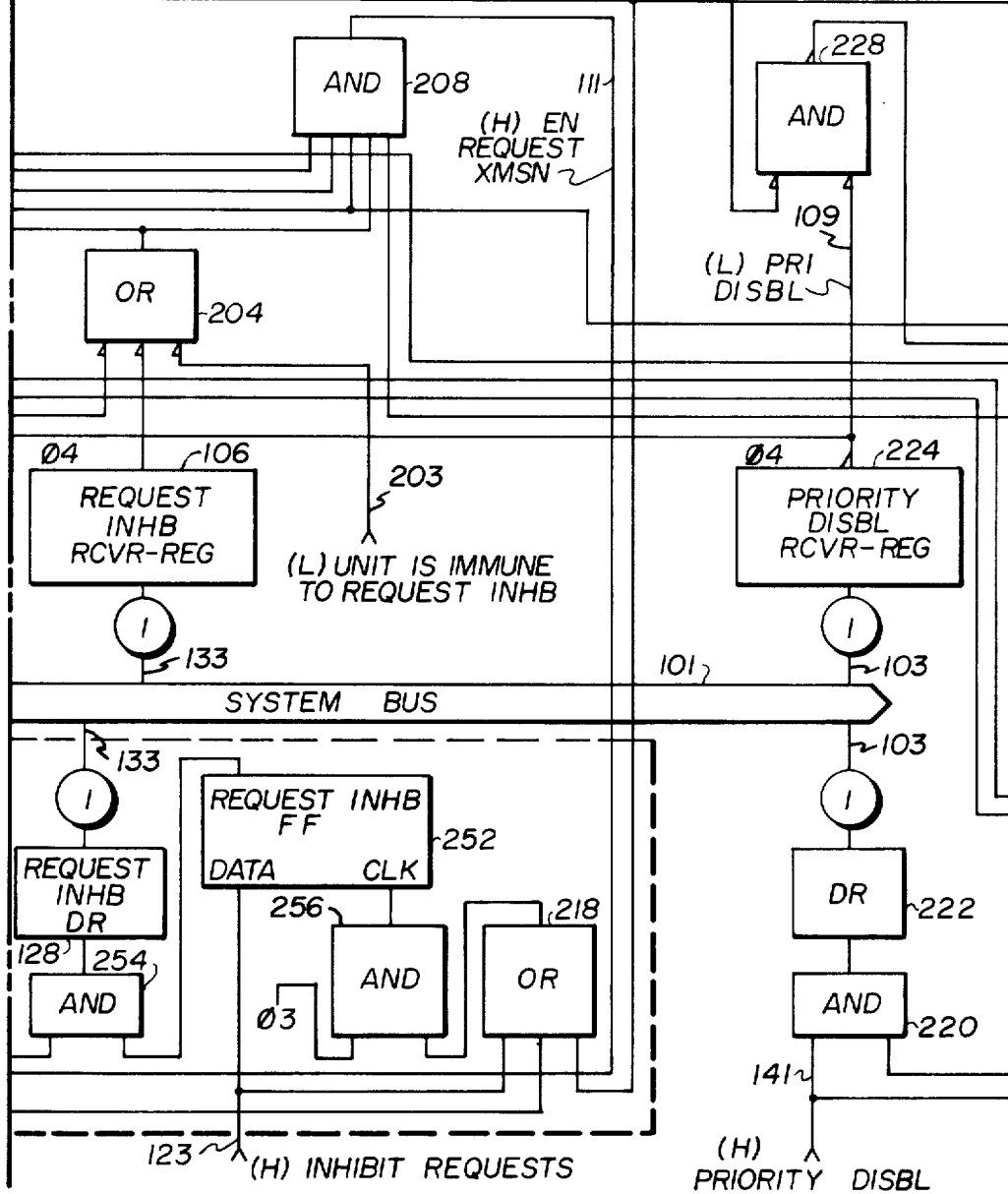

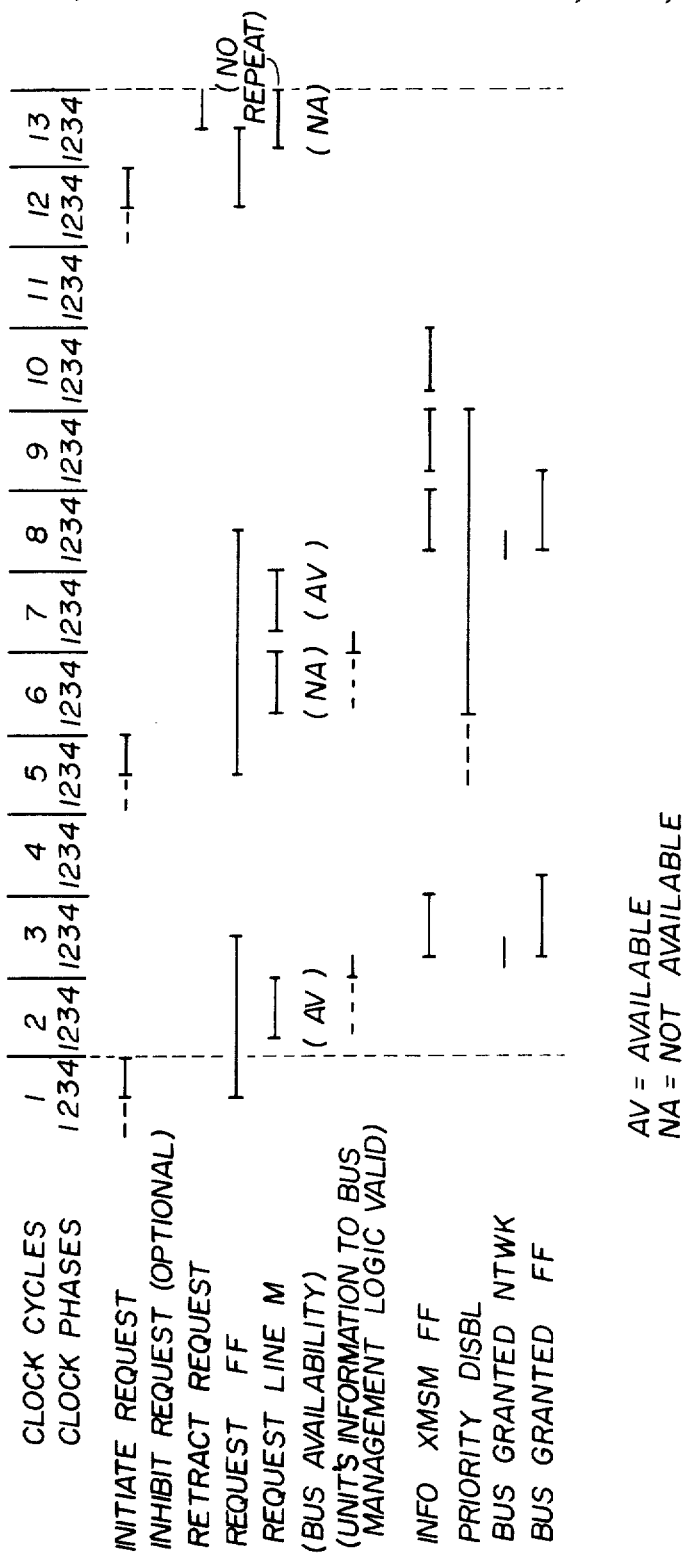

DISTRIBUTED BUS ARBITRATION ACCORDING EACH BUS USER THE ABILITY TO INHIBIT ALL NEW REQUESTS TO ARBITRATE THE BUS, OR TO CANCEL ITS OWN PENDING REQUEST, AND ACCORDING THE HIGHEST PRIORITY USER THE ABILITY TO STOP THE BUS

BACKGROUND OF THE INVENTION

The field of the invention relates to bused digital intercommunication and interconnect, and more particularly to certain control features of digital buses wherein arbitration as a means for resolving priority for bus access is fully distributed amongst bus user devices.

It is known in the prior art that arbitration, under a priority basis, for bus access amongst a number of contending units attached to such bus can be distributed, or performed simultaneously by replicated arbitration circuits contained within each of the bus-interconnected devices. Distributed arbitration for resolving priority in bus access is taught in U.S. Pat. No. 4,320,457 for COMMUNICATION BUS ACQUISITION CIRCUIT to Tanikawa [hereinafter Tanikawa]. Distributed bus arbitration wherein such arbitration is also time-phased, or conducted upon the same physical bus lines during a plurality of communication cycles, is taught in U.S. patent application, Ser. No. 356,051 for VERSATILE INTERCONNECTION BUS to D. B. Bennett, et al. [hereinafter Bennett]. The prior art in general teaches that arbitration for bus access at the distributed arbitration circuits within each of the bus-interconnected devices is synchronized by the ocurrence of a communication signal upon the bus. It is also generally taught in the prior art that the arbitration circuits at each device contending for bus access may arbitrate amongst $N+1$ total said devices on N arbitration bus lines in order to resolve a single, highest priority, one of such devices which wins arbitration and gains ownership of the digital communication bus for a communication thereon, which communication may transpire over a multiplicity of cycles. The prior art teaches that the activities of arbitration and data transfer may be time-overlapped, or pipelined in their occurrence (upon separate dedicated communication lines) upon the digital communication bus. The teaching of Bennett shows that plural such cycles of arbitration may be, to such extent as is possible, time-overlapped, or pipelined, with plural cycles of data transfer.

The present invention is concerned with certain particular control, or protocol, procedures in the distributed conduct of arbitration on synchronous digital communication buses. This control, or protocol, exists both between the User digital logic devices and those bus interface logics (such as are the subject of the present disclosure) which the User will communicate through to and from the digital communication bus, and as particular control, or protocol, signals carried upon the digital communication bus. The conduct of those control procedures implemented by the method and apparatus of the present invention generally are utilized, and make sense, only within the context of distributed arbitration for a digital bus. Within such a context, the control procedures of the present invention accomplish certain useful effects in the conduct (or nonconduct) of distributed arbitration. However, the effects of these control procedures—which include the effective implementation of "snapshot" priority (to be explained) and the ability of a highest priority user to stop the bus— have analogues in those effects accomplishable at a single, centralized, arbitrating authority when arbitration for a digital bus is not distributed. Generally, to accomplish during distributed bus arbitration that which may be more simply performed when arbitration is centralized will require those new control procedures which are the subject of the method and apparatus teaching of the present disclosure.

A first specific aspect of the method and apparatus for the control of distributed arbitration upon a digital communication bus in the present invention will be seen to be that a bus control line is instituted, called a REQUEST INHIBIT signal line, whereby each bus-interconnected arbitrating device may be inhibited from the registration of further, new requests beyond those already pending in arbitration. It is taught in the prior art that the single highest priority, arbitration-winning, bus-owning one of the contending devices may actuate a control line, called a PRIORITY DISABLE signal line within the circuit of the present invention, to suspend other bus-arbitrating devices from gaining, responsively to such arbitration, control of the bus in order that the present bus-controlling device may maintain bus control for a plurality of communication transfers during a like plurality of communication cycles thereon such bus. The first specific aspect of the present invention is not equivalent to the disablement or suspension of arbitration as by the PRIORITY DISABLE signal line or counterpart signals within the prior art, but rather allows arbitration to continue between all bus-interconnected arbitrating devices which have already registered requests for bus access. The intent of such an implemented capability is that a low priority bus requestor should be able to obtain access to an arbitrated digital communication bus in the face of such number and frequencies of higher priority requests as would normally block out the recognition of such lower priority requesting device.

This manner of the present invention in granting priority, whereby low priority devices may obtain access to a heavily contested bus system, is conceptually akin to prior art methods of implementing "snapshot" priority between multiple requestors contending for access to a single, multi-ported functional unit such as a memory. In such a system all pending requests are frozen, akin to a photographic "snapshot", at a time certain. The multi-accessed device, such as a memory, will then sort through all pending requests in a priority order, eventually thusly ensuring the servicing of even the lowest priority pending request at the time of the "snapshot". Implementation of such a concept when the arbitration is not centralized within a single device, such as the hypothetical memory device, is one subject of the present invention.

Of particular pertinence to the first aspect of the present invention, the prior art method and apparatus of Tanikawa prevents the single, highest-priority requestor from obtaining consecutive accesses to a contested bus. As explained at specification column 4, line 59–68 of Tanikawa "the [arbitration] lines . . . are coded to indicate the priority number of the highest priority contending device. However, once the highest priority device gains access to the bus . . . the priority number of the associated device is in effect removed from the [arbitration] lines of the bus. The setting of these lines is then conrolled by the highest priority device of the remaining contending devices seeking access to the bus." Thus the circuit of Tanikawa assures alternate servicing of at least the two highest priority contending devices, regardless of their frequency of request. Applicants' invention will suffice to service low, and even lowest, priority requestors even when access to the single, system bus, resource is so heavily contested that, under the prior art scheme of Tanikawa, only some lesser number of higher priority requestors would constantly win arbitration and control the single system bus resource, locking out lower priority requestors.

Also of particular pertinence to the first aspect of the present invention, in an alternative prior art solution the basic concept that certain, lower, priority devices may experience conflict to the point of lockout in contending, via arbitration, for access to a system bus is dealt with in the teaching of Bennett at his section 1.4: Distributed, Time-Phased Selectable Priority Arbitration. Bennett teaches an apparatus in which "intelligent" User devices may change their arbitration priorities for access to a system bus in accordance with their perceived need, or urgency, and their success in arbitrating for such bus at each increasing priority level. Of course, such User assumed multiple arbitration priority codes must be correlated with an over all system design plan. Allowing arbitration between up to 256 arbitration code identifications (assumed unique ones at any time by each interconnected device), the apparatus of Bennett supports the ultimate scheme wherein each User may arbitrate for the bus at a graduated, current processing dictated, priority. The variable arbitration so conducted is not of the "shapshot" conceptual type, however, and does not represent the ability of each unique ones of the interconnected devices to inhibit the requests of other devices to arbitrate the bus (thereby ultimately assuring its own access) as in the present disclosure, but rather to dynamically alter (within system-level constraints) its own priority of arbitration, leaving all other arbitrating devices unaffected.

As a second aspect of the present invention, User logics, being those logic circuits which utilize the bus through the arbitration logics, will be able to (in a timely manner) cancel a request previously made to arbitrate the bus. A similar concept of the cancellation of pending activities upon a digital communication bus is dealt with in the prior art reference of Bennett at his specification section 6.5: Versatile Bus Interface Logics to User Interface for the Special Operation of Cancelling a Pending Transaction, and accompanying FIG. 52e. The cancellation with which Bennett is concerned is, however, not that of distributed arbitration but rather of subsequent words in a multi-word data message, such multi-word messages as are generally permitted upon the digital communication bus of Bennett. As will be seen from the subject of the present disclosure, when User logics register a request to the arbitration circuitry for the conduct of arbitration upon a digital communication bus upon its behalf, then such request normally suffices to set an arbitration request flip-flop. Such a flip-flop is normally cleared upon the successful arbitration for the bus. Applicants teach a method and an apparatus by which a User may cancel its own pending request, thereby removing itself from arbitration, even should (and only if) such arbitration not have culminated in the winning of the bus by such particular User device.

As another point of comparison between the second aspect of the present invention, wherein each bus-interconnected device may cancel its own pending arbitration request, to the prior art disclosure of Bennett, it should be noted that the User logics interface to the synchronously timed versatile bus interface logics of Bennett do not require that an arbitration be completed successfully for such User. Rather, as shown in FIG. 88d of Bennett, the User logics will synchronously (in a timed relationship) indicate its intent to arbitrate within each present bus arbitration cycle via raising the High condition of equal (H) INIT TRANS meaning initiate transaction. During the High persistence of signal (H) AUTO RETRY, meaning retry arbitration, one only occurrence of this initiate transaction signal will suffice to cause the interface logics to continue arbitrating in the User's behalf, until and unless, the User wins ownership of the bus. If, however, the User does not create the logical true condition of signal (H) AUTO RETRY, then the User will arbitrate, successfully or unsuccessfully, once only for the ownership of each bus upon each occurrence of logically high signal (H) INIT TRANS. Thus the synchronous system of Bennett, as regards the capability of a user to synchronously discontinue arbitration requests, is essentially different than the apparatus and method of applicants wherein an arbitration request previously registered may be deregistered, or cancelled.

As a third aspect of the present invention, a method and apparatus will be taught whereby the User device arbitrating at the single highest bus priority may, through interface logics which are identically replicated in the interfacing of the bus to all Users, cause all bus activity save the arbitration to stop. The method and the apparatus of the present invention will teach that the single, highest priority, User requestor which is stopping the bus will cause to be maintained active a highest priority bus request line, thereby locking out other lower priority units. Meanwhile such highest priority User requestor is suspended from recognition that it has won arbitration for the bus. In such a state arbitration is perpetually conducted upon the bus, but the highest priority, arbitration-winning user does not recognize that it has won arbitration. In such a state, the system clock which controls the timing of the bus may be switched between alternative sources, including alternative sources variant in frequency, while the bus is suspended, or stopped, from conducting data transfer activity. The prior art teaches buses that are stoppable, or which can be stopped by individual requestors, but by methods and apparatus which are alternative to those of the present invention. A communication cycle on the prior art bus of Bennett is enabled only by the generation of a NOT BUSY signal by the bus-owning current master one of the interconnected devices. Arbitration on the prior art bus of Tanikawa similarly uses a busy-type signal, called BUSY, which is driven by the bus-owning master one device, in enablement of the conduct of arbitration. The busy-signal of Iawikawa cannot prevent the next single from transpiring, but the maintenance of such signal in the false condition can assure that bus activity (at least such activity as is not performed by the bus-owning master one device) will cease. Thusly, in the prior art circuits any current bus-owning master device could stop the bus. In the circuit and method of the present invention only the highest priority device, regardless of whether such device is a priori knowledgeable of its higher priority condition, will be successfully able to stop the bus. Additionally, the clock source may be switched, including in frequency, for the bus of the present invention during the stopped condition. This concept has not been explicitly dealt with in the prior art although the versatile bus of Bennett could, as a bus synchronously timed with the User devices, suffice to sustain an orderly stop should the clock in use be suspended with both phases in the logical Low condition, and a new clock (potentially at a different frequency) instituted to resume timing at the phase previously left off from.

SUMMARY OF THE INVENTION

The present invention is concerned with the method and apparatus of managing certain signal lines during the conduct of fully distributed bus arbitration on a digital communication bus.

The first aspect of the present invention is that each and any bus user may inhibit all new, meaning not previously registered upon the bus, requests by every other user in arbitration upon the bus. Such a bus user device inhibiting all other bus user devices from new requests in arbitrating the bus must itself be arbitrating for ownership of the bus at its own assigned priority, which may be a low priority. If the User device persists in inhibiting the registration of new requests in arbitration of the bus for a sufficient period of time, then eventually such arbitrating User device (which may be of low priority) will be uppermost in priority amongst all remaining user devices arbitrating for the bus, and will win arbitration, gaining ownership of the bus for the conduct of a communication transaction thereupon. Obviously such a capability of any bus user accords such user the capability to "snapshot", or to fix at some absolute time, the universe of bus-interconnected devices which have already registered requests in arbitrating for the bus. The bus user inhibiting the registration of new requests in arbitrating the bus may release such inhibition even though, and before, it may itself have won arbitration.

The first aspect of the present invention is implemented with a unique bus communication signal and line, called a REQUEST INHIBIT signal and line, whereby any user device interfaced to the digital communications bus can, by setting such line active, lock out further, new (only) requests to arbitrate the bus from all communicating user devices. The single request(s) already registered by individual device(s) to arbitrate the bus will be successively resolved amongst in a priority order. If the device causing the inhibiting of new arbitration requests via signal REQUEST INHIBIT maintains such signal for sufficient time, it is ultimately assured of being upper-most in priority itself; thereby gaining access to the bus. Thus a low priority interfaced device can use this signal and line to avoid being locked out during long periods of heavy bus usage amongst higher priority devices. As a subordinate aspect to this first aspect of the invention, it will further be taught that such a single, highest priority one, device may be selectively not subject to the arbitration REQUEST INHIBIT line of the digital communication bus, and may thusly not be prevented by another bus-interconnected device from performing arbitration of the bus.

As a second aspect of the present invention, a method and apparatus allowing the registration and then—selectively in a timely manner—deregistration or cancellation, of a bus user's own pending request to arbitrate the bus will be taught. In a conventional manner, synchronously timed User logics will register a request to their individually associated bus interface logics to arbitrate for communication upon the bus by simply causing the setting of a request flip-flop. It is the second aspect of the present invention that the User logics, having once set such flip-flop, may also, subsequently, timely cause the clearing of such flip-flop and thereby the cancellation of its own pending request to arbitrate the bus. Such clearing, or cancellation, is by dedicated signal and line between the user and the bus interface logics (which signal and signal line are not upon the bus), which signal and signal line is called RETRACT REQUEST. No unique signals or signal lines exist upon the digital communication bus in the implementation of this second aspect of the present invention.

It is the third aspect of the present invention that any bus user may stop the transfer of data upon the bus for itself and all lower priority bus users, regardless of the existence of any a priori knowledge of the numbers or existence of such lower priority bus users, if any. It is the third aspect of the present invention that the single highest priority one bus user device may stop the transfer of data upon the bus for all devices—effectively "stopping" the bus—regardless of whether such single highest priority one bus user device is a priori knowledgeable of its status as such highest priority one device. That data transfer upon the bus is stopped need not, and does not mean, that arbitration upon the bus is stopped. In fact, arbitration continues, and is the only bus communication activity which does continue, when the bus is "stopped" for the transfer of data.

This third aspect of the present invention is taught as a method and apparatus by which the user logics, may communicate with the associated bus interface logics to 1) cause such interface logics to make a constant request upon the bus while 2) simultaneously failing to recognize that it may have won the arbitration for the bus responsively to such continuous request. Although implemented in each and all interface logics which are identically replicated in the bused interconnection of all user logics, only when this third aspect feature is exercised by the single highest priority on bus-interconnected device will, resultantly to the constant continuing arbitration of such highest priority one device, said highest priority one device invariably win, and own the digital communication bus. No actual data communication by the highest priority one device will transpire, however; the recognition of such arbitration winning ownership by the highest priority device being inhibited. This third aspect of the present invention is enabled by a dedicated signal and signal line between the user logics and the bus interface logics or an external source (i.e., such signal and signal line is not upon the bus). The signal and signal line is called STOP BUS. No unique signals or signal lines exist upon the digital communication bus solely in implementation of the third aspect of the present invention.

This continuous control when performed by the highest priority one device is the "stopping" of the bus. The utility of such a capability to "stop" the bus is that the clocks, synchronous to all the interconnected bus interface logics, may be physically switched, including between differential frequency sources, and the bus intercommunication activities resumed, under bus "stoppage" control by the single highest priority one device, without in consistency or error in bus communication.

It is a subordinate fourth aspect of the present invention, which aspect is implemented as a method and apparatus compatible and integral with the method and apparatus supporting the first three aspects of the present invention, that a bus user device winning ownership of the bus through arbitration may maintain control of the bus for extension of the cycles of a first communication transaction as may transpire with first device(s), and may even maintain control of the bus for further successive communication transactions as may transpire to further second device(s). This subordinate fourth aspect of the present invention is accomplished by disabling the recognition of the winning of arbitration, which arbitration was conducted under a priority order, at all bus interconnected devices. This subordinate fourth aspect of the present invention is implemented with a unique signal and signal line upon the digital communication bus, which signal and signal line is called PRIORITY DISBL.

It is a subordinate fifth aspect of the present invention, implemented as a method and apparatus compatible and integral with that method and apparatus supporting all other aspects of the invention, that arbitration activity by the bus interface logics of any bus interconnected device may be caused to be stopped, or disabled. Such disablement is effected by the clearing of a unique flip-flop called the BUS ENABLE FF within such bus interface logics. The normal, initialized, condition of such flip-flop is the set condition, enabling the reconduct of arbitration. If such BUS ENABLE FF is cleared for any reason, such as by a maintenance processor desiring to delete or suspend one bus user from any activity upon the bus, then the bus interface logics will be ineffective for performing any aspect of arbitration whatsoever, including the other four aspects of this invention, for the associated bus user device.

BRIEF DESCRIPTION OF THE DRAWINGS

FIG. 3 shows a timing diagram of the operation of the logics of the present invention as shown in FIG. 2.

DESCRIPTION OF THE PREFERRED EMBODIMENT

Figure 1A:
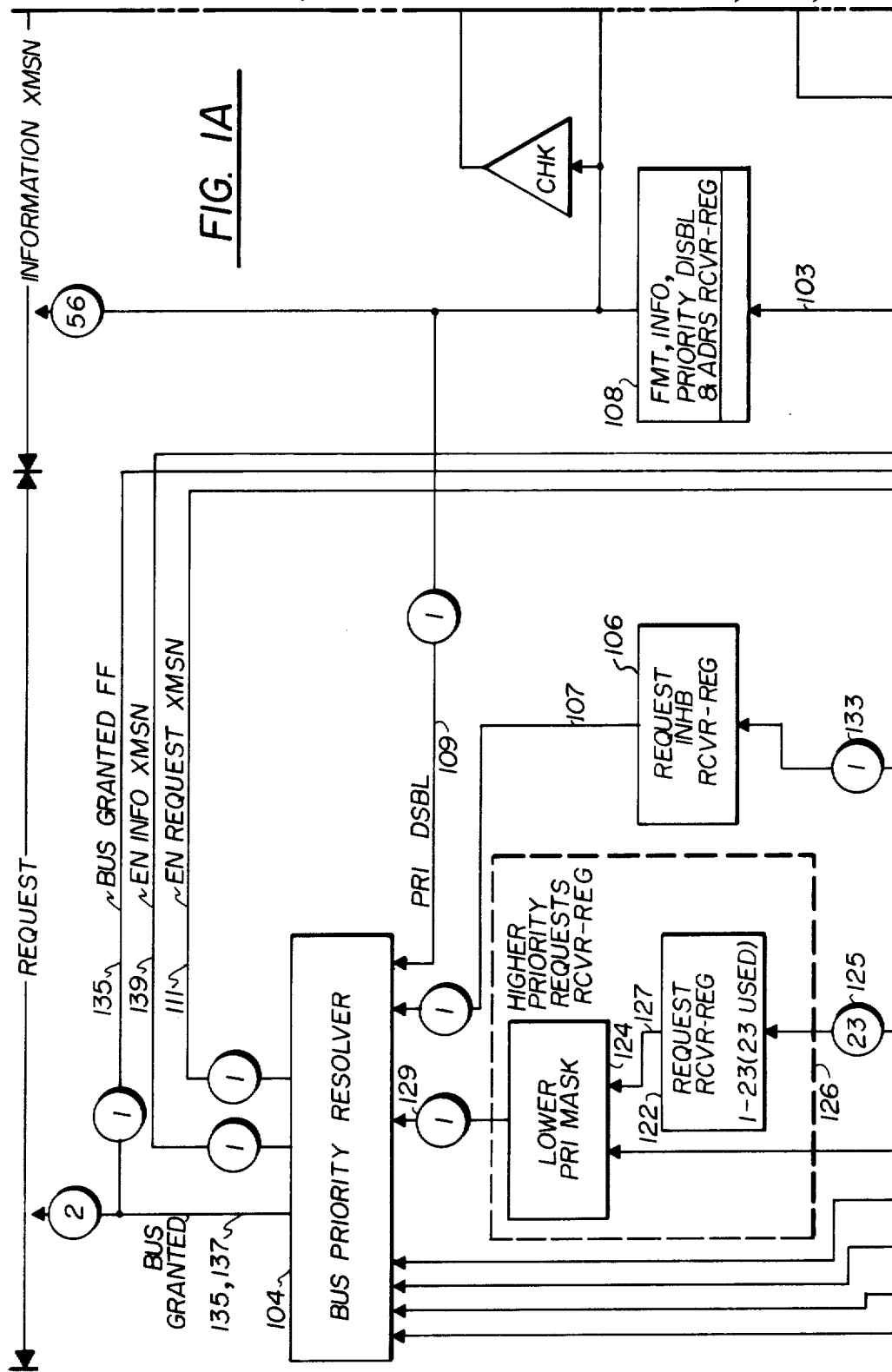
FIG. 1, consisting of FIG. 1a through FIG. 1d, shows a first level block diagram of the bus interface logic such as is replicated at each bus-interconnected device, and such as contains within a first, REQUEST, section the arbitration logics which are the subject of the present invention.
Figure 1B:
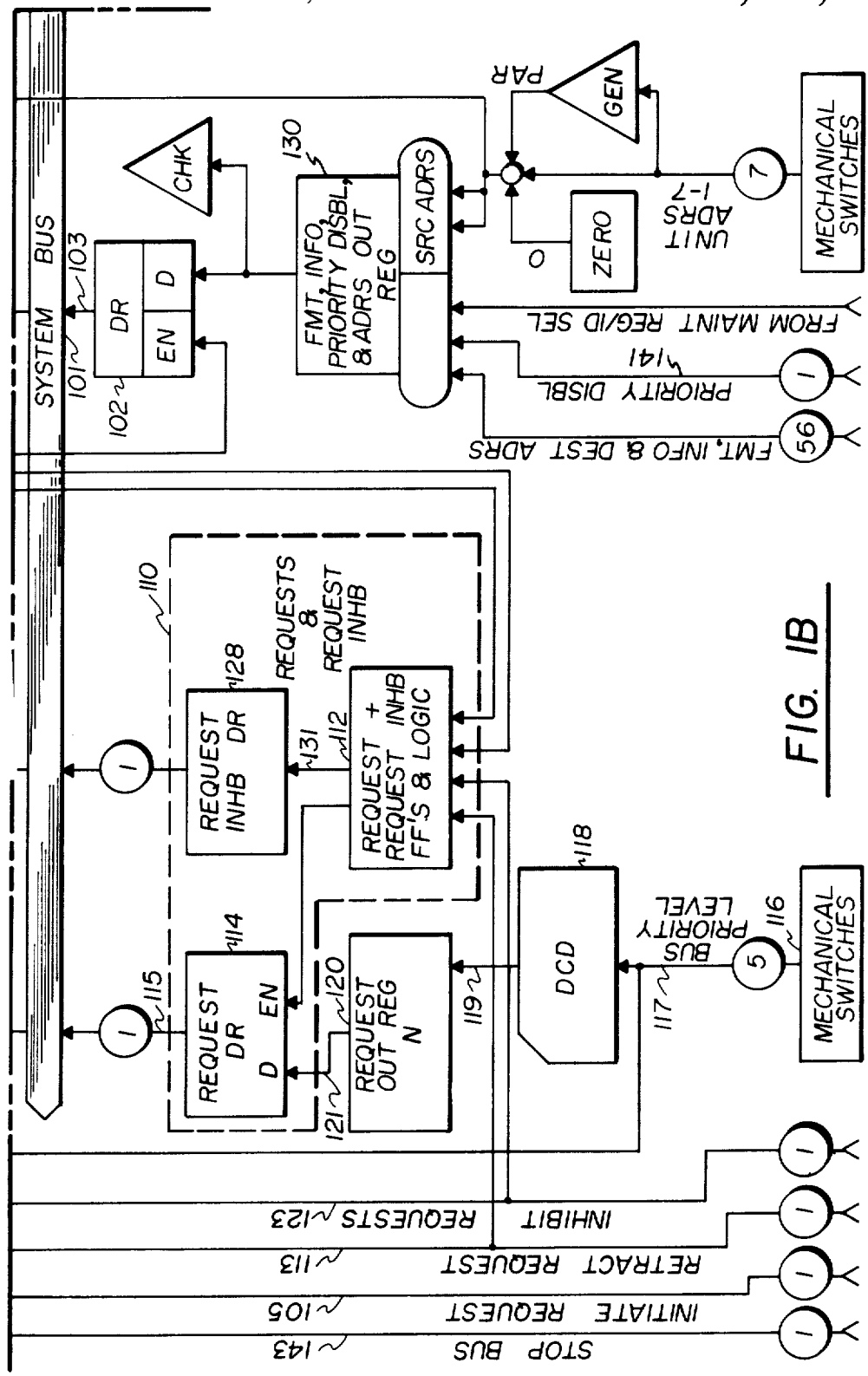
Figure 1C:
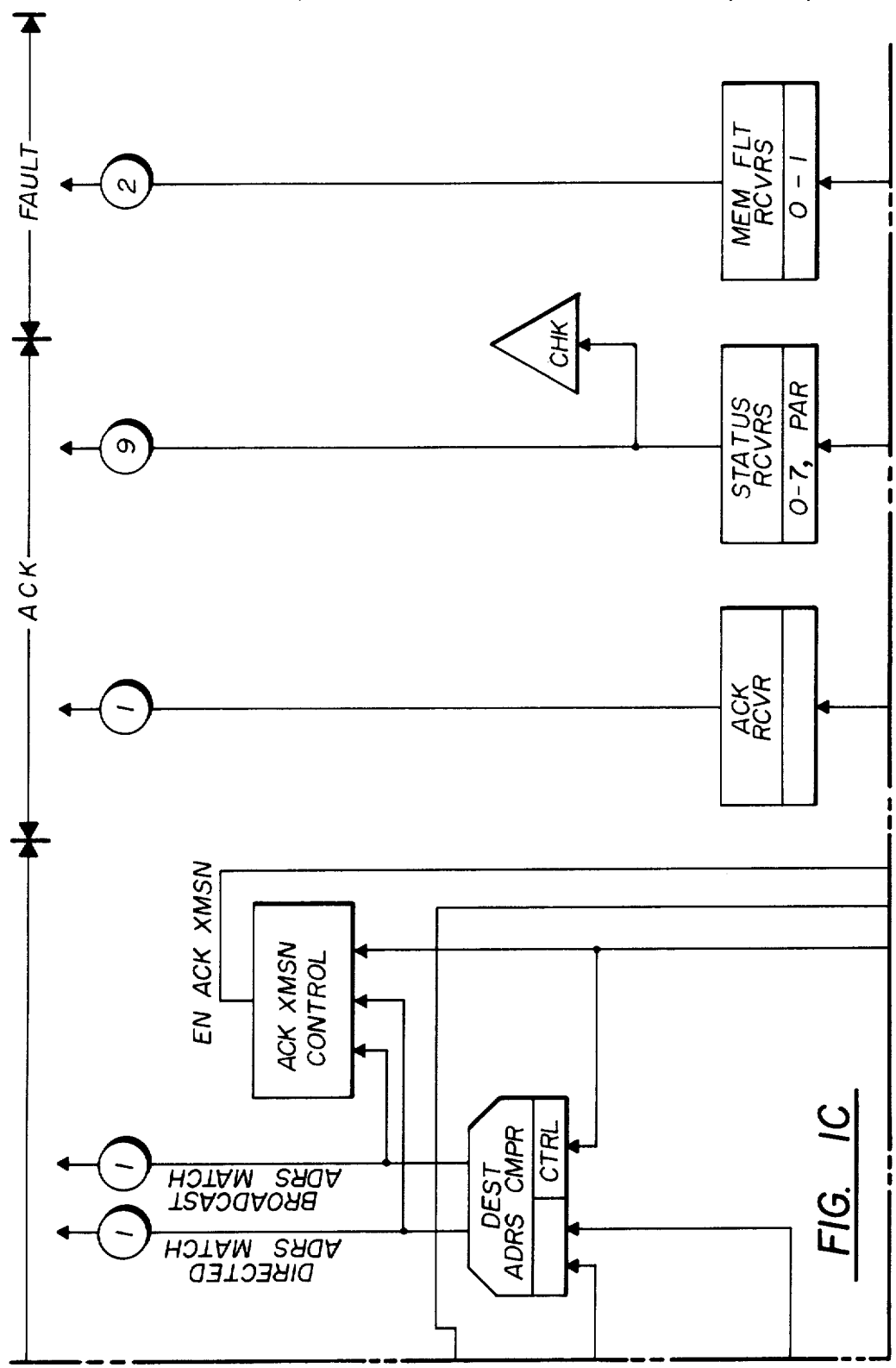

An overall, top-level, block diagram of the bus interface logics, of which the logics of the present invention form that part concerned with arbitration, is shown in FIG. 1, consisting of FIG.1a through FIG. 1c. The bus interface logics so shown in block diagram form are identically replicated at each communicating device interconnected to the SYSTEM BUS 101. The bus interface logics interconnect to SYSTEM BUS 101, as shown, and also by signal lines to the user device, also called user logics. Signals which are transmitted to the user logics from the bus interface logics are arrow, or "V" tipped, and shown at the top of the block diagram while signals received from the user logics or external sources are indicated by an inverted "Y" and shown entering from the direction of the bottom of the block diagram. The general functional sections of the logics involved with bus request and arbitration, information transmission, acknowlegements and error detection are shown in generalized partitioned areas across the top of the block diagram as sections REQUEST, INFORMATION XMSN, ACK and FAULT. The general principle of the operation of the digital bus is that users requesting bus access arbitrate for such bus until one only such user is declared the bus-owning master device for a communication transaction. Such user device then transmits information across the bus, which information is received by all units connected thereon but which is acknowledged by only one such unit.

In explanation of the general operation of the bus interface logics as shown in block diagram form in FIG. 1, before transmitting data information upon bus lines of the SYSTEM BUS 101 via line 103 (the numbers of which bus lines are not pertinent to the present invention) from drivers DR 102, the bus user must request, and win through arbitration, control of the SYSTEM BUS 101. In order to do so the user device renders signal INITIATE REQUEST on line 105 logically true, which signal is received at the logics of BUS PRIORITY RESOLVER 104. If the entrance of the bus interface logics into arbitration is not inhibited under a logically true signal received on line 107 from REQUEST INHB RCVR-REG 106, nor disabled under the logically high signal PRI DSBL received on line 109 as one of a plurality of signals received through the FMT, INFO, PRIORITY DISBL & ADRS RCVR-REG 108, then BUS PRIORITY RESOLVER 104 will output logically true signal EN REQUEST XMSN on line 111. Such signal EN REQUEST XMSN on line 111 is received into the REQUEST & REQUEST INHB logical subsection 110 where it is further gated into REQUEST & REQUEST INHB FF'S & LOGIC 112 by the signal RETRACT REQUEST on line 113 before being driven by REQUEST DR 114 via line 115 as the request signal carried upon a line uniquely dedicated thereto (one such line for each user device) on SYSTEM BUS 101. The signal RETRACT REQUEST on line 113 is involved with the second aspect function of the present invention giving each bus user device the ability to cancel its own, previously registered, request to arbitrate for ownership of the bus.

Continuing the explanation of the function of the bus interface logics at the block diagram level as shown in FIG. 1, the priority of each individual bus user device for access to such SYSTEM BUS 101 is assigned by the manual setting of MECHANICAL SWITCHES 116. Such MECHANICAL SWITCHES 116 are set in consideration of bus intercommunicating system elements and are normally fixed upon the initial configuration of each hardware system utilizing SYSTEM BUS 101. The binary signal outputs BUS PRIORITY LEVEL on line 117 (nominally five in number as allows the unique prioritization of a maximum at thirty-two bus-interconnected devices) are decoded in decoder DCD 118 and applied as a signal uniquely on one of twenty-three lines, line 119, to set the flip-flop REQUEST OUT REG 120. This flip-flop REQUEST OUT REG 120, the uniquely enabled one (of twenty-three) within the total bus interface logics, will, via a true signal on line 121, enable a unique one REQUEST DR driver element 114 which drives the unique one bus request line 115. Signal INHIBIT REQUESTS is involved with the first aspect of the present invention to inhibit the registration of new requests to arbitrate the bus by other user devices. Thus the binary signals BUS PRIORITY LEVEL on line 117 resultant from MECHANICAL SWITCHES 116 are decoded and utilized to select one only request line driver, such particular request line driver and request line responsively driven thereto which is unique amongst all devices connected via SYSTEM BUS 101.

Continuing in FIG. 1 with the explanation of the function of the bus interface logics, the total number of request lines, one of which is uniquely associated with each interconnected device upon SYSTEM BUS 101 are received via lines 125, arbitrarily N in number (N nominally equals twenty-three) as would be utilized for the interconnection of and arbitration between N+1 devices (twenty-four devices) into REQUEST RCVR-REG 122. All received request signals, including any request signal driven by the device itself, are transmitted as signals 1-23 on lines 127 to logics LOWER PRI MASK 124 along with the signals BUS PRIORITY LEVEL on lines 117. The simple priority and masking function of logics LOWER PRI MASK 124 is to gate only higher priority request lines than that of the current device (such priority as is carried by signals BUS PRIORITY LEVEL on lines 117) as a logically true signal on line 129 to the BUS PRIORITY RESOLVER logics 104.

Continuing in FIG. 1, each user may, via the logical true condition of signal INHIBIT REQUEST on line 123 (plus certain other conditions, such as that a request shall have been initiated), cause the REQUEST AND REQUEST INHB FF'S & LOGIC 112 to communicate a logically true request inhibit condition via line 131 to REQUEST INHB DR 128 and thence as the unique REQUEST INHIBIT signal line 133 upon SYSTEM BUS 101. Each bus-interconnected device senses such unique REQUEST INHIBIT signal line 133— such signal as is of importance to the first aspect function of the present invention according each bus user the ability to inhibit all new requests to arbitrate the bus—in the REQUEST INHB RCVR REG 106. The signal sensed upon the REQUEST INHIBIT signal line 133 is transmitted to BUS PRIORITY RESOLVER 104 via line 107 wherein it is used in conditioning the registration of new (not previously registered) request to participate in arbitration.

Continuing in FIG. 1, the winning of arbitration upon SYSTEM BUS 101 is resolved in the BUS PRIORITY RESOLVER 104 in consideration of the existence of any higher priority request as received on line 129 and the fact that, responsive to prior occurrence of signal INITIATE REQUEST on line 105 from the user device, the present unit is actively engaging in request for bus ownership as represented by the true condition of signal EN REQUEST XMSN on line 111. Upon the winning of arbitration, meaning that the present bus requesting unit was the highest priority one of all such units at that time requesting the bus, the true condition of two signals BUS GRANTED on lines 135, 137 will be transferred to the user device. One such signal, signal BUS GRANTED FF on line 135, will be utilized at the REQUEST AND REQUESTS INHB logical subsection 110 to clear the driving of further requests upon SYSTEM BUS 101. Additionally, the BUS PRIORITY RESOLVER logics 104 will establish the logical true condition of signal EN INFOR XMSN on line 139, which, when received as an enablement to the data drivers DR 102, will enable the driving of data upon SYSTEM BUS 101.

Continuing in FIG. 1, the signal STOP BUS on line 143 received from the user device or an external source into the BUS PRIORITY RESOLVER 104 is of particular concern to the third aspect function of the present invention for being involved in the ability of each user (or other external source) to disable any recognition (to and by the user) that arbitration has been won by such user. Although exercisable by any user, uniquely when exercised by the single highest priority user will the signal PRIORITY DISBL accord the ability to such highest priority user to stop data transfer upon the SYSTEM BUS 101. This is because the single priority user is constantly (1) requesting the bus, (2) winning arbitration and (3) unable to recognize its own ownership of the bus. The effects of both signal STOP BUS on line 143 and signal RETRACT REQUEST on line 113 in respectively implementing the third and second aspects of the present invention cannot be completely understood from the block diagram of FIG. 1, but must await the detailed explanation of the logic function of BUS PRIORITY RESOLVER 104 which is the substantial subject of FIG. 2.

Continuing in FIG. 1, the signal PRIORITY DISBL on line 141 received from the user device into the FMT, INFO PRIORITY DISBL & ADRS OUT REG 130 logics within the INFORMATION XMSN functional section of the bus interface logics is of particular concern to the subordinate fourth aspect function of the present invention for permitting a user device to retain the bus after ownership thereof (by winning arbitration) for the continuance of the instant communication transaction without re-arbitrating for ownership of the bus in order to do so. The signal PRIORITY DISBL on line 141, being concerned with arbitration, is shown in parallel with format, data and address information in the FMT, INFO, PRIORITY DISBL & ADRS OUT REG 130 because all such information is gated, when transmitted to drivers DR 102, by signal EN INFO XMSN on line 139. That the PRIORITY DISBL signal is gated by signal EN INFO XMSN onto SYSTEM BUS 101, equivalently to the way data is gated onto such SYSTEM BUS 101, will be shown in FIG. 2. The signal PRIORITY DISBL on dedicated signal line 103 of SYSTEM BUS 101 is received into FMT, INFO, PRIORITY DISBL & ADRS RCVR-REG 108, and further transmitted as signal PRI DSBL on line 109 to BUS PRIORITY RESOLVER logic 104.

The remaining logical structure block diagram in FIG. 1, including primarily the INFORMATION XMSN, ACK, and FAULT functional sections, is shown primarily so that the location, and context, of the present invention dealing with certain functions of the arbitration section in control of a digital communication bus may be more clearly recognized. The detailed logical function of remaining logics is not relevant to the performance of the function of the present invention. The logics concerning the PRIORITY DISBL signal and function will be shown in the detailed logic diagram of FIG. 2, and the sole logical interface exhibited by the circuit of the present invention, other than logical communication with the user device or other external signal sources or the SYSTEM BUS 101, is signal EN INFO XMSN on line 139. As previously stated, it may be recognized that this signal is an enablement of further functional stages of the bus interface control logic, in the present case the information transmission activity occurring within functional section INFORMATION XMSN shown in FIG. 1. It would, of course, make no difference in the function of the logic of the present invention should next sequential functional section(s) and activity(ies) be considered function code transmission, slave identification, or some other form of bus intercommunicative activity.

Figure 2A:
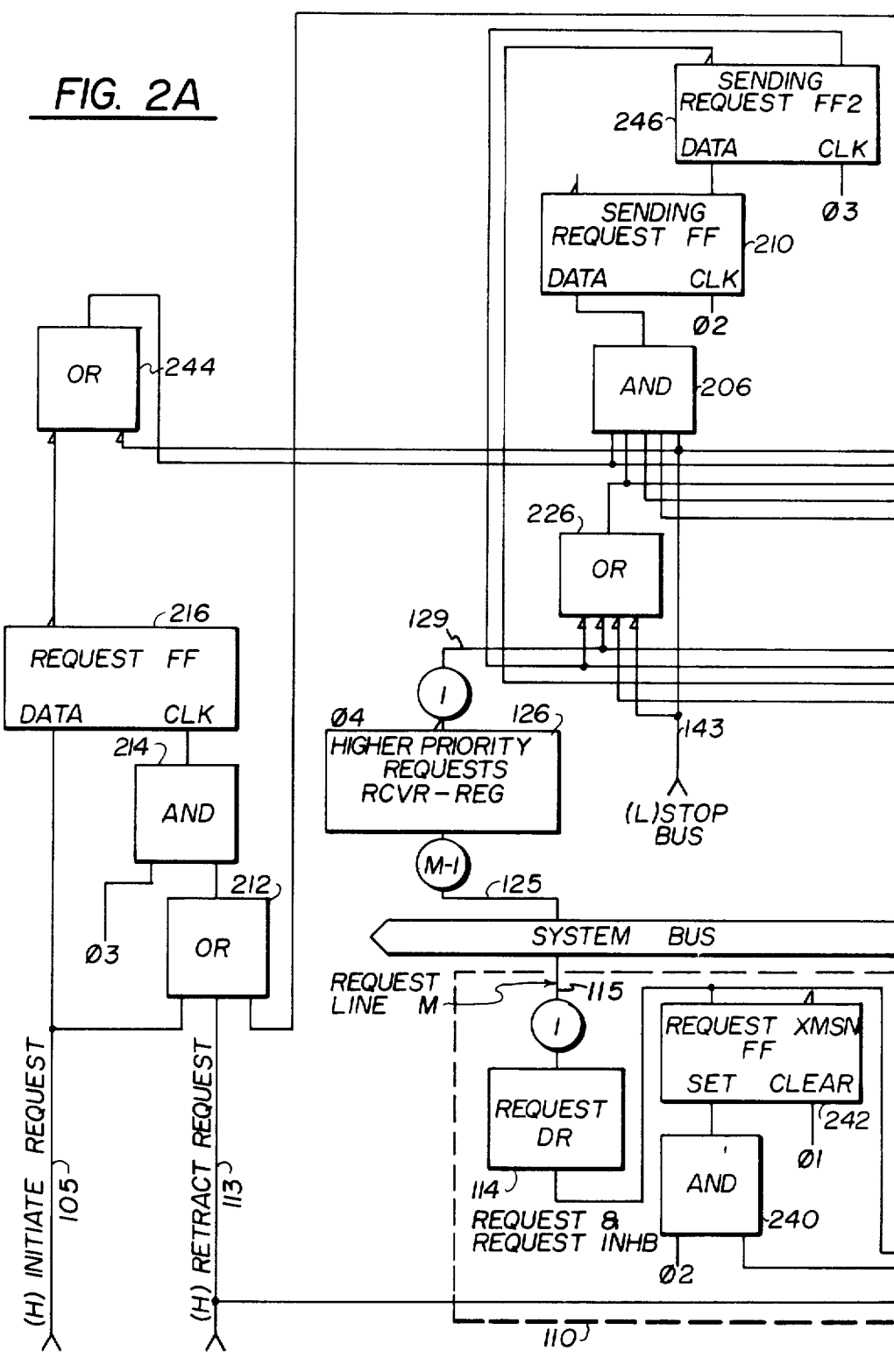
FIG. 2, consisting of FIG. 2a through FIG. 2c, shows a logic diagram of the logics of the present invention such as control distributed bus arbitration to accord to each bus user the ability to inhibit all new requests to arbitrate the bus or to cancel its own pending request, and such as accord the highest priority bus user the ability to stop the bus.
Figure 2C:
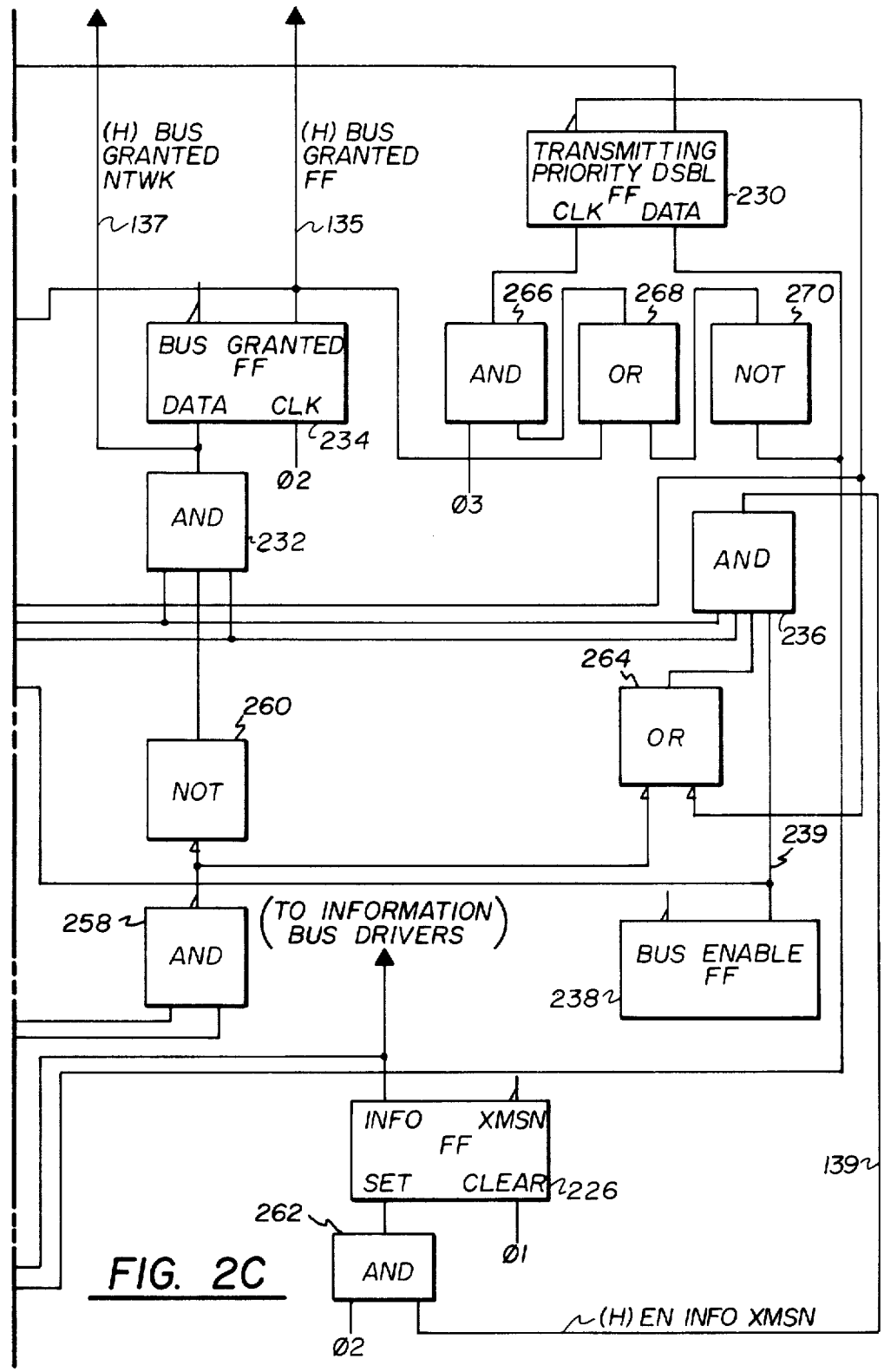

The complete logic diagram of the circuit apparatus of the present invention is shown in FIG. 2, consisting of FIG. 2a, and FIG. 2b, and FIG. 2c. Before entering into a detailed discussion of the functioning of the logics of the present invention as shown in FIG. 2, the general method and control paths by which the aspects of the present invention are exercised will be highlighted in order that, when the logics are later discussed in detail, the exact operation of the control of these aspects may be better understood. The first aspect of the present invention which accords each bus user the ability to inhibit all new requests to arbitrate a bus upon which such arbitration is distributed is based on the signal REQUEST INHB carried on dedicated signal line 133 upon SYSTEM BUS 101. The signal paths and logic elements shown in FIG. 2 which are solely in implementation of the first aspect of this invention, namely the capability to inhibit new requests in arbitration of the bus, are signal (H) INHIBIT REQUESTS on line 123 from the user device, the request inhibit flip-flop REQUEST INHB FF 252, AND gate 254, the request inhibit signal driver REQUEST INHB DR 128, the REQUEST INHIBIT signal on dedicated signal line 133 on SYSTEM BUS 101, the REQUEST INHIBIT signal receiver and register REQUEST INHB RCVR-REG 106, and OR gate 204. Any bus-interconnected user device can cause REQUEST INHB DR 128 of the assertive bus interface logics to drive the REQUEST INHIBIT signal on the single dedicated signal line 133 upon SYSTEM BUS 101 by raising the High condition of signal (H) INHIBIT REQUEST on line 123. The resultant REQUEST INHIBIT signal on line 133 of SYSTEM BUS 101 is received at the REQUEST INHB RCVR-REG 106 of all bus-interconnected devices. When received at OR gate 204, such REQUEST INHIBIT signal condition will dissatisfy AND gate 206 and also AND gate 208, respectively giving an attendant effect upon the setting of the SENDING REQUEST FF 210 and the development of the High, true, condition of signal (H) EN REQUEST XMSN on line 111. This dual function, when later explained, will be seen to be sufficient to block out further, new, requests to arbitrate the bus while allowing requests already registered to be continued to be maintained, to be arbitrated amongst in a normal priority order, and to be resolved so that each unit will respectively achieve bus access. Such may be recalled to be a purpose of the REQUEST INHIBIT function, such function as may be used by a low priority interface user device in order to preclude being permanently locked out during long periods of heavy bus usage amongst higher priority interface devices.

Similarly continuing in FIG. 2 with the preliminary identification of functional areas pertinent to particular aspects of the present invention, those siganl paths and logic elements shown in FIG. 2 that exist solely in implementation the second aspect of this invention, namely the ability of all bus user devices to cancel their own pending request, are signal (H) RETRACT REQUEST on line 113 and its connections to OR gate 212 and OR gate 218. Any bus user device desiring to cancel its own pending request provides the logical true, High, condition of signal (H) RETRACT REQUEST on line 113 which, as gated in AND gate 214 by clock $\phi_3$ will cause the clearing of REQUEST FF 216. Thusly this function is quite simplistic, although the interaction occurring through OR gate 218 with the REQUEST INHIBIT functional flow path, such as will be taught, adds a small additional complexity.

Similarly continuing in FIG. 2 with the preliminary identification of functional areas pertinent to particular aspects of the present invention, those signal paths and logic elements shown in FIG. 2 that exist solely in implementation of the third aspect of the invention, namely the capability by which the highest priority bus user device or an external signal source can stop bus activity, are signal (L) STOP BUS on line 143, OR gate 244, and the connection of signal (L) STOP BUS on line 143 to OR gate 226, AND gate 206, AND gate 232 and AND gate 236. This third aspect of the present invention particularly includes the ability of the unique one highest priority user device, such device as may not be a priori aware of its highest priority status, to stop data communication upon SYSTEM BUS 101. This function is accomplished because the highest priority device will constantly request and win arbitration for SYSTEM BUS 101 (such arbitration as obviously proceeds apace thereby meaning that the entirety of SYSTEM BUS 101 is not stopped, but rather only the data transfer communication activity) while failing to recognize its own arbitration-winning bus-owning status and, resultantly to the falure to so recognize, not transferring any data upon such SYSTEM BUS 101. The initial registration of a request to arbitrate the bus by the user device occurs via the logical High condition of signal (H) INITIATE REQUEST on line 105 as received at REQUEST FF 216. The manner by which such a single request will repetitively be registered, regardless of whether it should result in the winning of arbitration, and that further, information transfer upon the SYSTEM BUS 101 should be inhibited is obtained by the user device raising the true, Low, condition of signal (L) STOP BUS on line 143. Any user device can raise this true, Low, condition of signal (L) STOP BUS on line 143 in order to exercise this third aspect of the invention, but only when the single highest priority one user device raises this signal will all other devices be precluded, via the continuous losing of arbitration, from access to and data transfer upon SYSTEM BUS 101.

Similarly continuing in FIG. 2 with the preliminary identification of fucntional areas pertinent to particular aspects of the present invention, those signal paths and logical elements shown in FIG. 2 which are in implementation of the subordinate fourth aspect of the invention, namely that a bus-owing user device is accorded the ability to retain control of the bus for the extension of the present communication transfer or the conduct of further successive transfers, include signal (H) PRIORITY DISBL on line 141, AND gate 220, OR gate 222, the PRIORITY DISABLE signal on line 103 part of SYSTEM BUS 101, PRIORITY DISBL RCVR-REG 224, signal (L) PRI DISBL on line 109, AND gate 228, and the TRANSMITTING PRIORITY DISBL flip-flop 230.

Finally, those signal paths and logical elements initially identifiable in FIG. 2 which are in implementation of the subordinate fifth aspect of the present invention, namely that a particular device upon the bus may be stopped and disabled from all further activity upon the bus, is the BUS ENABLE FF flip-flop 238 and the connection of the output signal therefrom on line 239 to AND gate 208 and AND gate 236. Such a BUS ENABLE FF 238, with its selective ability to control the active status of each bus-interconnected device, could be set by a maintenance processor, or could be set by the associated user device.

In summary, and as will become increasingly clear as the detailed logical function of the logic apparatus of the present inention as shown in FIG. 2 is further explained, the general nature of the present invention is that an expanded amount of control is applied to the conduct of distributed arbitration. Such control is in the form of new interconnections to the user device, such as by signals (H) RETRACT REQUEST on line 113, (H) INHIBIT REQUESTS on line 123 and (H) PRIORITY DISBL on line 141. Such control may arrive via signals (L) STOP BUS on line 143 and (L) UNIT IS IMMUNE TO REQUEST INHB on line 203, which signals may arrive from a maintenance processor or from any user device connected to the bus, or from the particular user device connected to each bus interface logics. Finally, a BUS ENABLE FF 238 provides still another selective enablement in the control of the process of arbitration. Some of the expanded control functions implemented, notably the REQUEST INHIBIT and PRIORITY DISABLE functions, will utilize new, expanded, signals upon dedicated signal lines of SYSTEM BUS 101. That all such expanded control is available does not mean that it should invariably be used. However, the added complexity of the control applied to the conduct of distributed arbitration by the logic apparatus and method of the present invention has substantial parallelism to that sophisticated control which has always been applied to arbitration when such was previously conducted at a centralized location. When arbitration is distributed, the accomplishment of certain expanded control functions, which might be considerably simpler of implementation should arbitration be centralized, assumes new dimensions and complexity. Such added dimensions—such expanded procedures and methods in the conduct of distributed arbitration—are the subject of the present invention.

Commencing with the detailed description of the logical function of the present invention as shown in FIG. 2, the development of the request to participate in arbitration, signal REQUEST LINE M on line 115, will first be discussed. Signal REQUEST LINE M on line 115, which signal and line is unique for each of the SYSTEM BUS 101 interconnected devices, is developed responsively to the logical High condition of signal (H) EN REQUEST XMSN on line 111 as gated in AND gate 240 by the occurrence of clock $\phi 2$ to set the REQUEST XMSN FF 242. The setting of such REQUEST XMSN FF 242 will, from clock $\phi 2$ to the clear occurring upon the next following clock $\phi 1$, cause the REQUEST DR 114 to drive the REQUEST LINE M 115 upon SYSTEM BUS 101 for each associated cycle of distributed arbitration. The development of the High signal (H) EN REQUEST XMSN on line 111 is responsive to five High signal conditions in satisfaction of AND gate 208.

Continuing in FIG. 2 with the description of the development of signal (H) EN REQUEST XMSN on line 111 in AND gate 208, the first, left-most, enabling signal condition to AND gate 208 is obtained responsively to a request to arbitrate the bus by the user device. Such a user request results from the High condition of signal (H) INITIATE REQUEST on line 105 which sets the REQUEST FF 216 by satisfying the data input of REQUEST FF 216 and, through OR gate 212 and AND gate 214, the clock input of REQUEST FF 216. A Low signal from REQUEST FF 216 in the set, or the request enabled condition, satisfies OR gate 244 and produces a first High input signal into AND gate 208. The request flip-flop, REQUEST FF 216, may become cleared upon the conjunction of clock $\phi 3$, the absence of (H) INITIATE REQUEST on line 105, and a logical High signal output from OR gate 212 jointly in satisfaction of AND gate 214. Such a satisfaction of OR gate 212 can result from the logical High occurrence of signal (H) RETRACT REQUEST on line 113 during the period of clock $\phi 3$, or by the logical High occurrence of signal (H) BUS GRANTED FF on line 135 also during clock $\phi 3$. These two satisfactions of OR gate 212 respectively represent the ability of the user device to deregister (or cancel) a previously registered request, and the clearing of a request attendant upon the winning of arbitration for SYSTEM BUS 101.

The ability of the user to deregister (or cancel) a previously registered request is the second aspect of the present invention. As seen, it is essentially the simple procedure wherein a user device, having set the REQUEST FF 216 by the true, High condition of signal (H) INITIATE REQUEST on line 105 may subsequently, timely prior to winning arbitration which results in the true, High, occurrence of signal (H) BUS GRANTED on line 135, cause the clearing of such REQUEST FF 216 by raising the true, High condition of signal (H) RETRACT REQUEST on line 113 during the duration of clock $\phi 3$. There is a small further involvement of this signal (H) RETRACT REQUEST in the REQUEST & REQUEST INHB logics 110 concerning correct management of the request inhibit first aspect of the present invention, but generally the second aspect of the present invention is the simplest of implementation.

Continuing with the detailed explanation of the satisfaction of AND gate 208 in development of the logical High signal (H) EN REQUEST XMSN on line 111 as shown in FIG. 2, a second to the left-most High input signal to such AND gate 208 is derived from satisfaction of OR gate 226. Such OR gate 226 is associated with priority resolution. It is satisfied if one or more of the following four conditions is true. First, if a unit is not already sending a request as represented by the set condition of the SENDING REQUEST FF2 246, then the Low level clear side signal output of such SENDING REQUEST FF2 246 will satisfy OR gate 226. Secondly, if a higher priority request is active as represented by the logical Low signal output on line 129 from HIGHER PRIORITY REQUESTS RCVR-REG 126, then this condition will alternatively (additionally) satisfy OR gate 226. The HIGHER PRIORITY REQUESTS RCVR-REG 126 represents that structure previously seen in the block diagram of FIG. 1 which, in consideration of the priority level of the current device, determines whether any higher priority devices are currently actively requesting SYSTEM BUS 101. The signal output of HIGHER PRIORITY REQUEST RCVR-REG 126 is gated upon clock $\phi 4$, and valid therefrom clock $\phi 4$ to the next succeeding clock $\phi 4$, which may be observed to be in accordance within the time that signal REQUEST LINE M on line 115 is driven responsive to the management of the REQUEST XMSN FF 242. The time relationship of signals of interest within the logic diagram of FIG. 2 will later be seen in the timing diagram of FIG. 3. Thirdly, OR gate 226 can be satisfied by a Low signal arising at PRIORITY DISBL RCVR-REG 224, indicating that signal PRIORITY DISABLE on line 103 of SYSTEM BUS 101 has been gated in at clock φ4 as active during the current arbitration cycle. Such signal output from PRIORITY DISBL RCVR-REG 224 is signal (L) PRI DSBL on line 109 and is true, or Low, during the occurrence of the PRIORITY DISABLE operation, such as may be recalled to be associated with the retention of bus ownership for the extension of the present communication transaction or the conduct of further successive communication transactions. Fourthly, OR gate 226 may be satisfied by the logical Low condition of signal (L) STOP BUS on line 143 such as represents the activity of the interfaced user device, or any user device connected in common, or a maintenance processor user device, or a detached maintenance processor in stopping bus activity upon those bus interface logics shown in FIG. 2.

It is now possible to trace the third aspect function of the invention based on receipt of the true signal (L) STOP BUS On line 143. The true, or Low, condition of signal (L) STOP BUS on line 143 will substitute for the setting of REQUEST FF 216 in satisfaction of OR gate 244, producing a High output signal therefrom as a first signal in partial satisfaction of both AND gates 206 and 208. AND gate 206 is concerned with the qualification of generating requests in arbitration of SYSTEM BUS 101, whereas AND gate 208 is concerned with enabling the transmission of requests. Similarly, the Low condition of signal (L) STOP BUS on line 143 will also satisfy OR gate 226, substituting for any normal detection of no higher priority requests pending arising from HIGHER PRIORITY REQUESTS RCVR-REG 126, and causing from such OR gate 226 the provisions of a second signal in partial satisfaction of both AND gates 206 and 208. AND gate 206 is dissatisfied, however, by the final provision of Low signal (L) STOP BUS directly to such gate. Dependent upon additional signal inputs to AND gate 208 (involving the cleared condition of the TRANSMITTING PRIORITY DISBL flip-flop 230, the satisfaction of OR gate 204, and the cleared condition of BUS ENABLE FF 238) such as will be discussed, the signal (H) EN REQUEST XMSN will become constantly true, or High. This means that the present bus interface logics while subjected to signal (H) STOP BUS will be constantly registering a request in arbitration for ownership of SYSTEM BUS 101, regardless of what the user device may (elsewise) be doing with initiation of rquest via signal (H) INITIATE REQUEST on line 105 and/or the presence of higher priority requests. Meanwhile, a final provision of the active Low signal (L) STOP BUS to AND gate 232 will preclude the setting of BUS GRANTED FF 234 and the recognition by the user device (via signals (H) BUS GRANTED NTWK on line 137 and/or (H) BUS GRANTED FF on line 135) that arbitration (if even requested) has been won (if and when won). The net effect of signal (L) TOP BUS on line 143 is to cause a bus interface logics to arbitrate continuously without recognition that arbitration should ever be won. If the single highest priority one bus interface logics is subjected to the true condition of signal (L) STOP BUS on line 143—which signal may arise at the associated one user device which may not even know that it is highest priority on the bus, or may externally arise from a maintenance processor—then such highest priority logics will constantly arbitrate for and win the SYSTEM BUS 101. No data transfer upon such bus will transpire from the highest priority bus-owning one user device, nor from any lower priority device. The bus is ∓stopped", meaning that naught but arbitration is transpiring and that arbitration activity is without any effect save that a single highest priority one device does monopolize the bus resource.

Continuing in FIG. 2 with the detailed discussion of the satisfaction of AND gate 208 in development of High signal (H) EN REQUEST XMSN on line 111, the middle signal input to such AND gate 208 is derived from TRANSMITTING PRIORITY DISBL flip-flop 230. This signal will be High, enabling satisfaction of AND gate 208, when the present unit is not transmitting the PRIORITY DISBL signal on line 103.

Continuing in FIG. 2 with the discussion of the satisfaction of AND gate 208 in development of High signal (H) EN REQUEST XMSN on line 111, which signal enables the driving of a unique request line for participation in distributed arbitration for ownership of SYSTEM BUS 101, the second to the right-most High signal in partial satisfaction of AND gate 208 is derived from satisfaction of OR gate 204. Satisfaction of such OR gate 204 indicates that the present unit's request is not being inhibited. This satisfaction of OR gate 204 can result from any of the following three conditions. First, the present unit is already sending its request as represented by the set condition of SENDING REQUEST FF2 246 which, via the Low level set side signal output thereof, suffices to satisfy OR gate 204. Alternatively, or additionally, if the REQUEST INHIBIT line upon SYSTEM BUS 101 has not been active as gated into the REQUEST INHB RCVR-REG 106 during the proceeding φ4, then the logical Low signal output thereof such REQUEST INHB RCVR-REG 106 representing the absence of the true REQUEST INHB signal on line 133 of SYSTEM BUS 101 will suffice for satisfaction of OR gate 204. Thirdly, a Low signal (L) UNIT IS IMMUNE TO REQUEST INHB on line 203 will always suffice to satisfy OR gate 204 regardless of the setting of the REQUEST INHB RCVR-REG 106.

Continuing in FIG. 2, it is now possible to trace the first aspect function of the present invention by which any user may inhibit the registration of new requests to arbitrate the SYSTEM BUS 101. The user device desiring to inhibit the registration of further requests to arbitrate SYSTEM BUS 101 raises the true, High, condition of signal (H) INHIBIT REQUEST on line 123 such as is the data input to the REQUEST INHB FF D-type flip-flop 252 wherein the state of the DATA input is transferred to the flip-flop only when the CLK, or clock, input is satisfied. The High signal (H) INHIBIT REQUESTS on line 123 will satisfy OR gate 218, the High signal output of which is gated through AND gate 256 upon the occurrence of clock φ3 to clock the data input, for setting, of the REQUEST INHB FF flip-flop 252. The user device so desiring to inhibit the registration of new requests by all devices, including itself, must, logically, already have registered its own request to arbitrate the bus as represented by the set condition of the REQUEST XMSN FF flip-flop 242. To stop the registration of new requests to arbitrate SYSTEM BUS 101 of all denies, including all devices, while a user device is itself not arbitrating for such SYSTEM BUS 101 is nonsensical, and not allowed. Thus the High, set side, signal output of REQUEST INHB FF flip-flop 252 in conjunction with only the high set side signal output of the REQUEST XMSN FF flip-flop 242 satisfies AND gate 254 and resultantly enables the REQUEST INHB DR 128 to drive the REQUEST INHIBIT signal on dedicated signal line 133 of SYSTEM BUS 101. The active, or High, condition of signal REQUEST INHIBIT on dedicated signal line 133 of SYSTEM BUS 101 is gated into the REQUEST INHB RCVR-REG 106 of all the interface logics of all the respective devices interconnected to such bus. Considering now the function of OR gate 204 in the instance of a High signal output from REQUEST INHB RCVR-REG 106, such High signal as represents the receipt of an active REQUEST INHIBIT signal on SYSTEM BUS 101, such OR gate 204 may still be satisfied by the set condition, producing a logical Low set side signal output, of the SENDING REQUEST FF2 flip-flop 246. This first enabling signal input to OR gate 204 from the SENDING REQUEST FF2 flip-flop 246 is the means by which bus interface logics already having registered requests to arbitrate, may continue in arbitration. Forbearing that such SENDING REQUEST FF2 flip-flop 246 is set, or should it become clear, then OR gate 204 will not be satisfied save that signal (L) UNIT IS IMMUNE TO REQUEST INHB is Low, indicating that the present unit is immune to having its request inhibited. Such a signal is, by the inverted "Y" symbology, indicated to most commonly arrived from the associated one user device which desires not to be blocked out from arbitration upon SYSTEM BUS 101 regardless of the attempt to so inhibit its arbitration by other user devices upon such SYSTEM BUS 101. Such signal (L) UNIT IS IMMUNE TO REQUEST INHB on line 203 may also be established by the system designer to be hardwired, or to arrive from a remote control source such as a maintenance processor. When OR gate 204 is dissatisfied, producing a Low signal output therefrom, as is normally the case upon the receipt of the active REQUEST INHIBIT signal on line 133 of SYSTEM BUS 101 when the present bus interface logics are not arbitrating, then both AND gate 206 and AND gate 208 will be dissatisfied. The dissatisfaction of AND gate 206 means that a bus interface logic, including the particular bus interface logics which did receive the High condition of signal (H) INHIBIT REQUEST on line 123, will be precluded from the registration of new, previously unregistered, requests to arbitrate the bus via the setting of the SENDING REQUEST FF flip-flop 210 and subsequently the setting of the SENDING REQUEST FF2 flip-flop 246. Similarly, the dissatisfaction of AND gate 208 means that signal (H) EN REQUEST XMSN on line 111 will be low, meaning that the REQUEST XMSN FF flip-flop 242 may not be set or reset. Note again that any previously existent setting of the SENDING REQUEST FF2 flip-flop 246 prior to the receipt of the REQUEST INHIBIT signal on line 133 of SYSTEM BUS 101 will, via the low signal proceeding from the set side output thereof to OR gate 204 allow of the development of high signal (H) EN REQUEST XMSN on line 111 in AND gate 208. It is merely through the dissatisfaction of AND gate 206 that such SENDING REQUEST FF2 flip-flop 246 may not become reset, regardless of whether a user device should via signal (H) INITIATE REQUEST on line 105 cause, or recause, the setting of the REQUEST FF flip-flop 216. If a user device desires to get its request to participate in arbitration onto the bus regardless of whether some other device should be causing the true condition of the REQUEST INHIBIT SYSTEM thereon such bus, then such user may raise the low condition of signal (L) UNIT IS IMMUNE TO REQUEST INHB on line 203.

Continuing in FIG. 2 with the discussion of the satisfaction AND gate 208 in development of the high signal (H) EN REQUEST XMSN, the right-most, fifth and final, signal input to such gate is derived from the set side signal output on line 239 of the BUS ENABLE FF flip-flop 238. This BUS ENABLE FF flip-flop 238 is normally set, providing a High signal on line 239 in final satisfaction of AND gate 208. The BUS ENABLE FF flip-flop 238 represents the subordinate fifth aspect of the present invention by which a particular unit's bus communicative activity may be stopped and disabled. No particular signal is shown in the control of the setting and clearing of the BUS ENABLE FF flip-flop 238 because such signal may arise from a number of locations dependent upon the choice of the system designer. Signals in control of such BUS ENABLE FF fip-flop 238 might arise from the individual associated one user device, in which case such signal lines would be identified with the inverted "Y" symbology elsewheres utilized in FIG. 2. Alternatively, such BUS ENABLE FF flip-flop 238 might be controlled in any one bus interface logics (such as the subject of FIG. 2) by another user device than that one uniquely associated with the bus interface logics within which the particular BUS ENABLE FF flip-flop 238 appears. Finally, such BUS ENABLE FF flip-flop 238 might be controlled by a maintenance processor, such as may, or may not, be communicative on SYSTEM BUS 101. The setting and clearing of the BUS ENABLE FF flip-flop 238, by whatsoever source, represents the enablement of a very simple idea: mainly, that the activity of the entire interface logics shown in FIG. 2 for communication upon SYSTEM BUS 101 may be selectively disabled upon the clearing of such enablement flip-flop.

Continuing in FIG. 2, discussion to this point has centered on the satisfaction of AND gate 208 in the development of true, High, signal (H) EN REQUEST XMSN on line 111. During the course of the explanation of the logical satisfaction of such AND gate 108, the logic implementation of the first, second, third, and fifth aspects of the present invention has been discussed.

Continuing in FIG. 2, the satisfaction of AND gate 106, which AND gate receives four of the same five signals as were previously discussed for being supplied to AND gate 208, will next be discussed. The first, left-most, signal input in partial satisfaction of AND gate 206 is derived from OR gate 244 and will be High when the user device is desirous of sending a request in arbitration for system bus 101, such desire as is represented by the setting of the REQUEST FF flip-flop 216. The second, second to the left-most signal in partial satisfaction of AND gate 206 is derived from OR gate 226, previously discussed as being associated with priority resolution, which signal will be High when no higher priority request in arbitration of SYSTEM BUS 101 is active. The third, middle, signal in satisfaction of AND gate 206 is identical to the like signal input to AND gate 208 and is derived from the TRANSMITTING PRIORITY DSBL flip-flop 230. As stated in conjunction with the discussion of AND gate 208, the clear side signal output of the TRANSMITTING PRIORITY DSBL flip-flop 230 will be High, partially enabling satisfaction of AND gate 206, when the present bus interface logics is not transmitting the PRIORITY DISBL signal on line 103 of SYSTEM BUS 101. The management of the priority disable function as the fourth aspect of the present invention will soon be discussed. The fourth, second to the right-most, signal input in satisfaction of AND gate 206 is derived from OR gate 204. Such a signal from OR gate 204 will be High in partial enablement of AND gate 206 if either (1) no REQUEST INHIBIT signal on line 133 of SYSTEM BUS 101 is being received by the REQUEST INHB RCVR-REG 106, or else (2) the unit is immune to having its request inhibit, as represented by the Low condition of signal (L) UNIT IS IMMUNE TO REQUEST INHB on line 203, or the SENDING REQUEST FF2 flip-flop 246 is already set, indicating that a request in arbitration which has not yet resulted in the winning of ownership of SYSTEM BUS 101 has already been registered. The fifth and final, right-most, signal in partial satisfaction of AND gate 206 is signal (L) STOP BUS on line 143, such signal as will be High in accordance with the third aspect of the invention save that the user device is attempting to arbitrate continually while barring its recognition of the results of such arbitration (tantamount in the highest priority one user device to "stopping" the bus). The High signal output developed from AND gate 206 in satisfaction thereof is gated at the DATA INPUT to the SENDING REQUEST FF D-type flip-flop 210 upon the occurrence of the CLK input of signal $\phi2$. Similarly, the High set side signal output of such SENDING REQUEST FF flip-flop 210 is gated at the DATA input to the SENDING REQUEST FF2 D-type flip-flop 246 upon the occurrence of the CLK signal input of clock signal $\phi3$.

Continuing in FIG. 2, the satisfaction of AND gate 232 indicating that arbitration is won and that bus access is granted for the next clock cycle will next been discussed. A first, left-most, signal input in partial satisfaction of AND gate 232 is derived from AND gate 228. Such AND gate 228 will be dissatisfied, producing a high output signal therefrom, if either or both of the following two conditions are true. First, if the present bus interface logics is not transmitting priority disable, then TRANSMITTING PRIORITY DSBL flip-flop 230 will be cleared and a first true, Low, signal input will be supplied to AND gate 228. Second, and as an alternative or additional condition to the first condition, if the unit is not receiving the PRIORITY DISBL signal on line 103 of SYSTEM BUS 101 in the PRIORITY DISBL RCVR-REG 224, then the High, false, condition of signal (L) PRI DISBL on line 109 developed in such PRIORITY DISBL RCVR-REG 224 will suffice to dissatisfy AND GATE 228. It may be recalled that signal (H) PRIORITY DISBL on line 103 of SYSTRM BUS 101 is involved with the fourth aspect feature of the present invention allowing a user device, after winning arbitration for ownership of the bus, to retain the access thereof for the extension of the present communications transfer or the conduct of successive communications transfers. The AND gate 228 is satisfied, producing a Low signal output therefrom, only when the present unit is not transmitting PRIORITY DISABLE as represented by the clear condition of the TRANSMITTING PRIORITY DSBL flip-flop 230 while a PRIORITY DISBL signal is received on line 103 of SYSTEM BUS 101, producing, when received on line 103 of SYSTEM BUS 101, producing when received in the PRIORITY DISBL RCVR-REG 224, the Low signal (L) PRI DISBL on line 109. Such a Low signal resultant from another unit, not the present unit, transmitting signal PRIORITY DISBL satisfies AND gate 228 and results in the dissatisfaction of AND gate 232, thereby precluding that the present user device should be granted the bus.

Continuing in FIG. 2 with the discussion of the satisfaction of AND gate 232, which satisfaction represents the winning of arbitration and the granting of bus priority to the associated one user device, the middle, second, signal in partial satisfaction of AND gate 232 is derived from NOT inverter element 260. This NOT inverter element 260 is supplied with a Low signal input, which, as inverted, suffices for partial satisfaction of AND gate 232 only when AND gate 258 is satisfied. AND gate 258 is satisfied by a first, left-most, High signal input resultant from the set condition of SENDING REQUEST FF2 flip-flop 246, such as represents the condition that the present bus interface logics is sending a request in arbitration for ownership of SYSTEM BUS 101. A second, rightmost, High signal input is supplied in satisfaction of AND gate 258 from the HIGHER PRIORITY REQUESTS RCVR-REG 126 only when no high priority request than the request of the present unit is detected to be active upon SYSTEM BUS 101. The conjunction of such two signal conditions means that the present bus interface logics has won arbitration for ownership of SYSTEM BUS 101.

Continuing in FIG. 2 with the discussion of the satisfaction of AND gate 232, a third and final, right-most, signal input to such AND gate 232 as is derived as signal (L) STOP BUS on line 143. This signal will be logically High, partially enabling AND gate 232, if the present unit is not being stopped, or disabled, from bus communicative activity. The satisfaction of AND gate 232 produces High signal (H) BUS GRANTED NTWK on line 137, which signal is supplied to the associated one user device as an indication of the winning of arbitration for ownership of SYSTEM BUS 101. Additionally, the HIgh signal resultant from satisfaction from AND gate 232 is clocked as the DATA INPUT to the BUS GRANTED FF flip-flop 234 by the CLK input signal $\phi2$. The set side signal output of the BUS GRANTED FF flip-flop 234, High when the present bus interface logics have won arbitration, is transmitted to the user as signal (H) BUS GRANTED FF on line 135. This signal (H) BUS GRANTED FF on line 135 is also transmitted to OR gate 212 in satisfaction thereof, and then through AND gate 214 as gated by the occurrence of clock signal $\phi3$ to clear, as the CLR signal input, the REQUEST FF flip-flop 216. Forbearing that the user device has retracted the request via the High condition of signal (H) RETRACT REQUEST on line 113, the winning of arbitration, resultant in High signal (H) BUS GRANTED FF on line 135, is the normal way by which REQUEST FF flip-flop 216 becomes reset, or clear.

Continuing in FIG. 2, the High signal (H) BUS GRANTED FF on line 135, resultant from the setting of the BUS GRANTED FF flip-flop 234, is also received in satisfaction of OR gate 218 within the REQUEST AND REQUEST INHIB functional logical subsection 110. The High signal output resultant from satisfaction of OR gate 218 is gated through AND gate 256 on the occurrence of clock signal $\phi3$ to clock, as the CLK input signa, the REQUEST INHB FF flip-flop 252. This REQUEST INHB FF flip-flop 252 had originally become set upon the High occurrence of signal (H) INHIBIT REQUEST on line 123 as exercised by a user device desiring to inhibit the registration of new arbitration requests upon SYSTEM BUS 101. Thus the later winning of arbitration on, and ownership of, SYSTEM BUS 101 resulting in the setting of the BUS GRANTED FF flip-flop 234 does result in the clearing of the REQUEST INHB FF flip-flop 252 responsively to the High signal (H) INHIBIT REQUEST on line 123, may subsequently cancel such inhibiting requests by the High signal (H) RETRACT REQUEST on line 113, which signal is also received at OR gate 218. Thus signal (H) RETRACT REQUEST on line 113, previously discussed in conjunction with the second aspect function of the present invention allowing each bus user device cancel its own pending request, does likewise offer each such user device the ability to cancel a previously registered inhibiting of the requests of others to newly arbitrate SYSTEM BUS 101.

Continuing in FIG. 2, the function of AND gate 236 and associated circuitry will next be discussed. The satisfaction of AND gate 236 produces High signal (H) EN INFO XMSN which enables information transmission during the next clock cycle. Such high signal (H) EN INFO XMSN is gated by clock signal $\phi 2$ in AND gate 262 to set the INFO XMSN FF flip-flop 226. Such INFO XMSN FF flip-flop 226 remains set until receiving, as the CLR signal input, the next clock $\phi 1$. The clear side signal output thereof such INFO XMSN FF flip-flop 226, High when the flip-flop is set, is provided (as indicated) TO INFORMATION BUS DRIVERS in order that it may enable such drivers to clock data upon signal lines of SYSTEM BUS 101. Such information bus drivers may carry data, function, command, or any other type of information hwihc is desired to be communicated upon information lines of SYSTEM BUS 101 during the enxt clock cycle. It may be noted that the set side signal output of the INFO XMSN FF flip-flop 226, a High signal only when the present bus interface logics have won arbitration are enabled for information transmission, does gate signal (H) PRIORITY DISBL on line 141 in AND gate 220.

Continuing in FIG. 2 with the discussion of the satisfaction of AND gate 236 in the development of High signal (H) EN INFO XMSN, the first, left-most, signal input to such AND gate 236 is derived from AND gate 228. As previously explained in conjunction with the discussion of the satisfaction of AND gate 232, such AND gate 228 will be dissatisfied, producing a High signal output therefrom, if the signal PRIORITY DISBL is not being driven by another bus interface logics on signal line 103 of SYSTEM BUS 101 which makes that signal (L) PRI DISBL on line 109 as produced in PRIORITY DISBL RCVR-REG 224 will be High thus dissatisfying AND gate 228 and producing a High output signal therefrom. Alternatively, or additionally, if the present unit is not itself transmitting signal PRIORITY DISBL on line 103 of SYSTEM BUS 101, then the TRANSMITTING PRIORITY DISBL FF flip-flop 230 will be set, producing a High set side output signal therefrom which, when received in AND gate 228, will dissatisfy such AND gate 228 producing a High output signal therefrom.

Continuing in FIG. 2 with the discussion of the satisfaction of AND gate 236, the second, to the left-most, input signal in partial satisfaction thereof is signal (L) STOP BUS on lien 143. Such signal (L) STOP BUS on line 143 will be High, partially enabling AND gate 236 in the development of sixal (H) EN INFO XMSN on line 139 which enables information transmission, when the present bus interface logics are not being instructed by the associated one user device, or some additional controlling device, to cease bus activity.

Continuing in FIG. 2 with the discussion of the satisfaction of AND gate 236, the third, second to the rightmost, signal received in partial satisfaction of such AND 236 is derived from OR gate 264. Such OR gate 264 is satisfied, producing a High output signal therefrom, when basic priority resolution is satisfied. One manner by which this may occur is that the present bus-owing user interface logic is, responsively to user initiation, transmitting signal (H) PRIORITY DISBL on line 103 of SYSTEM BUS 101 in order to retain control of such SYSTEM BUS 101 after access thereto for the purposes of extending the present transfer, or the conduct of further successive transfers, in accordance with the fourth aspect of the present invention. In such case, TRANSMITTING PRIORITY DSBL FF 230 will be set, producing a Low clear side signal output therefrom which satisfies OR gate 262. Alternatively, satisfaction of OR gate 262 may be obtained from satisfaction of AND gate 258, which AND gate is satisfied if the present bus interface logics is sending a request and no higher priority request is active. Such conditions in satisfaction of AND gate 258, and thence OR gate 262, are derived from the set side signal output of the SENDING REQUEST FF2 flip-flop 246 and the HIGHER PRIORITY REQUEST RCVR-REG 126. Such two signals will both be High only when the present bus interface logic is sending a request in arbitration of SYSTEM BUS 101, and no higher priority request is seen to be active by the HIGHER PRIORITY REQUEST RCVR-REG 126 (producing a High output signal). Satisfaction of AND gate 258 and thence OR gate 262 represents the normal path by which the bus interface logic wins arbitration in ownership of SYSTEMM BUS 101, thereby owning such bus for an information transfer thereon as will transpire responsibility to the generation of High signal (H) EN INFO XMSN on line 139.

Continuing in FIG. 2 with the explanation of the satisfaction of AND gate 236, the fourth, right-most signal input to such AND gate 236 is derived on line 239 from the BUS ENABLE FF flip-flop 238. Such BUS ENABLE FF flip-flop 238 will normally be set, enabling the present bus interface logics to be enabled, and not to stop during normal operations. The High set side output thereof such BUS ENABLE FF flip-flop 238 on line 239 will suffice in final partial satisfaction of AND gate 236, allowing High signal (H) EN INFO XMSN to be developed on line 139.

Continuing in FIG. 2, the fourth aspect function of the present invention for allowing an arbitration-winning bus-owning user device to retain bus access for the extension of a present transfer, or the conduct of further communication transfers, during successive clock cycles will next be examined. Such fourth aspect functional capability of the invention is enabled by the High signal (H) PRIORITY DISBL on line 141 originating at the user device. Such signal (H) PRIORITY DISBL on line 141 is gated through AND gate 220 by the High signal arising from the clear side of INFO XMSN FF flip-flop 226 when such flip-flop is set upon the occurrence of the present bus interface logics winning arbitration upon, and ownership of, SYSTEM BUS 101. The gated PRIORITY DISBL signal is amplified in DR driver 222 and transmitted upon a unique signal line of SYSTEM BUS 101, such signal line as is indicated to be part of line 103 previously shown in FIG. 1. The PRI- ORITY DISABLE signal on a dedicated signal line of SYSTEM BUS 101 is received at the PRIORITY DISBL RCVR-REG 224 wherein it is gated to set a flip-flop upon the occurrence of clock signal $\phi 4$. The true condition of signal PRIORITY DISABLE on SYSTEM BUS 101 results in the Low, or true, condition of signal (L) PRI DSBL on line 109 which will permit the satisfaction of AND gate 228 only when additionally the TRANSMITTING PRIORITY DSBL FF flip-flop 230 is cleared, producing a Low set side output signal therefrom. The satisfaction of AND gate 228 products a Low otuput signal therefrom, which, when received at respective AND gate 232 and 236, respectively disables a user device from recognizing the winning of priority by signals (H) BUS GRANTED NTWK on line 137 and/or by signal (H) BUS GRANTED FF on line 135, and also prevents the associated bus interface logic of such user device as is not transmitting PRIORITY DISBL from gating data onto the SYSTEM BUS 101 by generation of Low signal (H) EN INFO XMSN on line 139. Conversely, it should be noted that if the present bus interface logics receiving the true condition of signal PRIORITY DISBL on SYSTEM BUS 101 is that bus interface logics associated with the user device which did raise the High signal (H) PRIORITY DISBL on line 141, then the TRANSMITTING PRIORITY DSBL FF flip-flop 230 will be set, producing a High set side signal output therefrom which will suffice for dissatisfaction of AND gate 228. Resultingly, such single one user device as is itself causing the transmission of signal PRIORITY DISBL on SYSTEM BUS 101 will have satisfaction of both AND gate 323 and AND gate 236 as are respectively involved with the notification with the winning of arbitration to such user, and the gating of further information onto SYSTEM BUS 101.

Continuing in FIG. 2, the raising of the High signal (H) PRIORITY DISBL on line 141 by a user desiring to retain control of SYSTEM BUS 101, upon which such time as the associated bus interface logics of such user device do win in arbitration ownership of SYSTEM BUS 101, is received at the TRANSMITTING PRIORITY DSBL FF flip-flop 230 as the DATA signal input. At a prior time before the user device did desire to transmit the PRIORITY DISBL signal on SYSTEM BUS 101, signal (H) PRIORITY DISBL on line 141 would have been false or Low. This Low signal as received at NOT inverter element 270 would have been inverted to a High signal, which as supplied to OR gate element 268 would suffice for satisfaction of that element producing a High signal output therefrom. This High signal output of OR gate 268 as gated through AND gate 266 upon the occurrence of clock signal $\phi 3$ would produce a high CLK clocking signal input into TRANSMITTING PRIORITY DSBL FF flip-flop 230, which would cause the Low condition of the DATA input signal to such flip-flop to clear the flip-flop. When signal (H) PRIORITY DISBL on line 141 goes high, representing the desire of a user device to retain bus access, then this High signal is inverted in NOT inverter element 270 and supplied as a Low, or partially disabling signal, to OR gate 268. Thus, OR gate 268 can only be satisfied upon the occurrence of High signal (H) BUS GRANTED FF on line 135 as occurs upon the setting of the BUS GRANTED FF flip-flop 234 upon the winning of arbitration by the present bus interface logics. Only upon such occurrence will OR gate 268 be satisfied producing a high signal output therefrom which, when gated in AND gate 226 upon the occurrence of clock signal $\phi 3$ will suffice, as the CLk clocking signal input to the TRANSMITTING PRIORITY DSBL FF flip-flop 230, to allow the setting of such flip-flop responsively to the High signal upon the DATA input thereof.

The timing diagram of the function of the bus interface logics of the present invention, which were shown in FIG. 2, is shown in FIG. 3. Each CLOCK CYCLE may be observed to consist of four CLOCK PHASES, which clock phases signal $\phi 1$ through signal $\phi 4$ were previously seen to be used in FIG. 2. The first line signal INITIATE REQUEST represents signal (H) INITIATE REQUEST on line 105 previously seen in FIG. 2. The solid line representation of the occurrence of such signal commencing at clock $\phi 3$ and ending at clock $\phi 1$ in intended to represent when the bus interface logics can recognize such signal in the setting of the REQUEST FF flip-flop 216 previously seen in FIG. 2. The condition of such REQUEST FF flip-flop 216 is shown as the line REQUEST FF in FIG. 3, which flip-flop is observed to become set responsive to the occurrence of signal INITIATE REQUEST and responsively to which REQUEST LINE M become active upon the next following clock $\phi 2$. The signal REQUEST LINE M which represents the arbitration signal of the bus interface logics was previously seen as line 115 on SYSTEM BUS 101 in FIG. 2. The line (BUS AVAILABILITY) shown in FIG. 3 is not a signal line, but rather a conceptual representation of the AV (available) or NA (not available) condition of SYSTEM BUS 101 respectively to the arbitration REQUEST LINE M request for ownership thereof by the present bus interface logics. Upon the left-most series of signal occurrences illustrated in FIG. 3, such SYSTEM BUS 101 is illustrated to be available by symbology (AV). The line (UNITS INFORMATION TO BUS MANAGEMENT LOGIC VALID) shown in FIG. 3, which line becomes solid upon the third occurrence of clock $\phi 1$, is intended to represent that time at which arbitration requests are valid on SYSTEM BUS 101 responsive to the time management of the REQUEST XMSN FF flip-flop 242 shown in FIG. 2. Momentarily referring to FIG. 2, responsively to the adequate time for signal propagation within the logics illustrated therein, including the HIGHER PRIORITY REQUEST RCVR-REG 126, the determination or arbitration-winning bus-owning status will be possible upon the next clock $\phi 1$ to that previous clock $\phi 2$ upon which REQUEST LINE M was made active. Momentarily noting signal (H) BUS GRANTED NTWK on line 137, the BUS GRANTED FF flip-flop 234 and signal (H) BUS GRANTED FF on line 135 resultant therefrom, and the INFO XMSN FF flip-flop 226 in FIG. 2, and then returning to FIG. 3, the corresponding signal line INFO XMSN FF, BUS GRANTED NTWK and BUS GRANTED FF are visible as indications of the signal conditions attendant upon the winning of arbitration.

Continuing in FIG. 3, the second, middle, series of signals of the timing chart shown are representative of the timed sequence of signals occurring within a bus interface logics wherein the SYSTEM BUS 101 (shown in FIG. 2) is not immediately available, i.e., is not immediately won, by the arbitration of the present bus interface logics. It may be noted that upon the registration of the INITIATE REQUEST condition during clock cycle 5 shown in FIG. 3, the User device did before or at the next clock $\phi 3$ raise the condition PRIORITY DISBL indicating that if, and when, ownership of SYSTEM BUS 101 (shown in FIG. 2) were to be obtained by arbitration, then such unit desires to retain such ownership for an extended number of clock cycles of communication transactions thereon such SYSTEM BUS 101. Continuing with the second, middle, sequence of timed signals shown in FIG. 3, it may be noted that after losing arbitration occurring during clock cycle 6, the present bus interface logic does will arbitration during clock cycle 7 resulting in normal occurrence of signals INFO XMSN FF, BUS GRANTED NTWK, and BUS GRANTED FF. Moreover, under the continuing occurrence of the PRIORITY DISBL condition (corresponding to the high condition of signal (H) PRIORITY DISBL on line 141 shown in FIG. 2) the signal INFO XMSN FF (corresponding to the set condition of the INFO XMSN FF flip-flop 226 shown in FIG. 2) does persist for three cycles, namely cycle 8 through cycle 10. Note that one communication cycle of bus ownership is retained responsively to the occurrence of the PRIORITY DISBL condition up to the beginning of clock $\phi 1$ of such cycle.

Continuing in FIG. 3, the third, right-most, series of signals intend to illustrate the function of the RETRACT REQUEST OPERATION, such as corresponds to signal (H) RETRACT REQUEST on line 113 previously shown in FIG. 2. The occurrence of the INITIATE REQUEST condition has resulted in the setting of the REQUEST FF 216 and the raising of the REQUEST LINE M of SYSTEM BUS 101 (shown in FIG. 2). However, arbitration for such SYSTEM BUS 101 not having been won during this initial cycle as represented by the notation "(NA)" regarding bus availability, the signal RETRACT REQUEST is timely raised at or upon clock $\phi 3$. Such a signal will cause, without the winning of arbitration, the clearing of the REQUEST FF and the cessation of the raising of REQUEST LINE M, such as the meaning of the notation "(NO REPEAT)" shown in FIG. 3. The effect of the occurrence of condition INHIBIT REQUEST (OPTIONAL)—corresponding to the receip of the REQUEST INHB signal on dedicated signal line 133 of SYSTEM BUS 101 (shown in FIG. 2)—is noted, but not illustrated by example, in FIG. 3 for essentially postponing the setting of the REQUEST FF condition and the resultant arbitration vai REQUEST LINE M For those units for which such conditions have not been previously established upon the occurrence of the INHIBIT REQUEST (OPTIONAL) condition.

While the present invention of a DISTRIBUTED BUS ARBITRATION ACCORDING EACH BUS USER THE ABILITY TO INHIBIT ALL NEW REQUESTS TO ARBITRATE THE BUS, OR TO CANCEL ITS OWN PENDING REQUEST, AND ACCORDING THE HIGHEST PRIORITY USER THE ABILITY TO STOP THE BUS has been described with reference to the preferred embodiment, it is to be noted that variations may suggest themselves to those of skill in the art upon the reading of the present specification. It is therefore asserted that the spirit and the scope of the present invention must be interpreted in a broad sense from the following claims.

What is claimed is:

1. In a digital communication system including a digital communication bus and a plurality of bus User devices communicably interconnected to said bus by a like plurality of bus interface logic circuits, which bus interface logic circuits do, responsively to initiation by the associated bus User device, perform distributed arbitration for ownership of said digital communication bus, an improvement to said bus interface logic circuits performing distributed arbitration to the end that one such said bus interface logic circuit should be able to preclude that other said bus interface logic circuits should newly enter said distributed arbitration, said improvement within each said bus interface logic circuits comprising:

request inhibit flip-flop means for receiving a true condition request inhibit control signal from said associated bus User device that desires to preclude that the bus interface logic circuits associated with other ones of said bus User devices should newly enter into distributed arbitration, and for storing said true condition request inhibit control signal until such time as said distributed arbitration is won for said associated User device;

request inhibit signal drive means for, conditionally upon entrance into said distributed arbitration responsively to said initiation by said associated bus User device, driving said true condition of said request inhibit control signal as stored within said request inhibit flip-flop means as a true REQUEST INHIBIT signal upon a dedicated signal line of said digital communications bus; and request inhibit signal receiver and preclusion means for receiving said true REQUEST INHIBIT signal upon said dedicated signal line of said digital communication bus, and for responsively thereto the duration of said true REQUEST INHIBIT signal suspending, or precluding, that, responsively to the initiation of said associated bus User device, said distributed arbitration should be newly entered;

whereby that bus interface logic circuit receiving a true condition request inhibit control signal cannot preclude itself from newly entering said distributed arbitration because said driving of said true condition of said REQUEST INHIBIT control signal upon said bus by that bus interface logic circuit is conditional upon having already made entrance into said distributed arbitration;

whereby ones of said plurality of bus interface logic circuits as have not already made, responsively to said initiation by associated ones of said plurality of bus User devices, entrance into said distributed arbitration by that time of said receiving of said true REQUEST INHIBIT signal upon said dedicated signal line are thereafter precluded from doing so until such time as that said bus interface logic unit which did receive said true condition request inhibit control signal from the associated User device has won said distributed arbitration for said associated User device, and does no longer store said true condition request inhibit control signal.

2. The digital communication system of claim 1 wherein each said request inhibit flip-flop means within each said bus interface logic circuit further comprises:

request inhibit flip-flop means for storing said true condition request inhibit control signal condition until such time first as said distributed arbitration is won for said associated User device, or until such time second as said associated bus User device raises the true condition of a retract request control signal that said associated bus User device does retract, meaning cancels, said previous desire to preclude that the bus interface logic circuits associated with other ones of said bus User devices should newly enter into distributed arbitration, whichever such time first or such time second is first occurring.

3. The digital communication system of claim 2 wherein each said bus interface logic circuit further comprises:

priority disable signal drive means for, upon and during such time as both a true condition priority disable control signal is received from said associated bus User device and said distributed arbitration is won for said associated User device, driving a true PRIORITY DISABLE signal upon a dedicated signal line of said digital communications bus;

priority disable signal receiver and suspending-of-bus-granting means for receiving said true PRIORITY DISABLE signal upon said dedicated signal line of said digital communications bus, and responsively thereto the duration of said true PRIORITY DISABLE signal both suspending that notification of the winning of arbitration in ownership of said bus should be given to that associated bus User device for which said bus interface logic circuit does win said distributed arbitration, and also suspending that said bus interface logic circuit which does win said distributed arbitration and said associated bus User device should, either one, be enabled to transfer data upon said bus;

whereby said bus User device which does both raise said true condition priority disable control signal and win ownership of said digital communication bus is able, by the duration of said true condition priority disable control signal, to retain said ownership of said digital communications bus as against subsequent winners of said distributed arbitration.

4. A digital communication system including a digital communication bus and a plurality of bus User devices interconnected to said bus by a like plurality of identical bus interface logic circuits, each said bus interface logic circuits comprising:

arbitration logic means for, responsively to an associated said bus User device, entering into arbitrating for ownership of said bus by transmitting the true state of an associated arbitration signal, called a REQUEST signal, upon an associated one of a plurality of first signal lines of said bus, and for, responsively to the receipt of arbitration signals upon said plurality of first signal lines of said bus, determining whether arbitration is won and ownership of said bus is obtained IN ORDER THAT IF arbitration is not won THEN continuing said transmitting of said true state of said associated arbitration signal, ELSE if arbitration is won ceasing said transmitting of said true state of said associated arbitration signal;

arbitration inhibit transmitter logic means responsive to said associated said bus User device for transmitting the true state of an arbitration inhibit signal, called a REQUEST INHIBIT signal, upon a second signal line of said bus until such time as arbitration is won; and arbitration inhibit receiver logic means for receiving said true state of said arbitration inhibit signal, said REQUEST INHIBIT signal, upon said second signal line of said bus and responsively thereto for causing the suspension of only said entering into said arbitrating for ownership of said bus for the duration of said true state of said arbitration inhibit signal, while not causing any effect upon said determining, said continuing said transmitting, and said ceasing said transmitting;

whereby since each said bus interface logic circuits does not transmit said true state of said arbitration inhibit signal save while arbitrating for ownership of said bus, then said receiving of said true state of said arbitration inhibit signal by the selfsame said bus interface logic circuit which is transmitting said true state of said arbitration inhibit signal is without effect, said selfsame said bus interface logic circuit having already done said entering into arbitrating for ownership of said bus;

whereby said receiving of said true state of said arbitration inhibit signal at any said bus interface logic circuits does only cause said suspension of said entering into arbitration, and does not effect said continuing arbitrating of these said bus interface logic circuits as have already, at the time of said receipt of said arbitration inhibit signal, entered into said arbitrating.

5. The digital communication system of claim 4 wherein each said bus interface logic circuits further comprises:

arbitration and arbitration inhibit cancellation logic means responsive to said associated said bus User device for ceasing said transmitting of said true state of said associated arbitration signal, and for also ceasing said transmitting of said true state of said arbitration inhibit signal, said ceasing occurring even should arbitration not yet have been won, said ceasing thus being a cancellation of the continuing participation within said arbitrating, and also being a cancellation of said suspension of said entering into arbitration by said arbitration inhibit signal.

6. The digital communication system of claim 5 wherein each said bus interface logic circuits further comprises:

priority disable transmitter logic means responsive to said associated bus User device for, upon such time as arbitration is won, transmitting the true state of a signal allowing ownership of said but to be retained as against subsequent winners of arbitration, called a PRIORITY DISABLE signal, upon a dedicated third signal line of said bus for so long as said associated bus User device does desire to retain ownership thereof said bus; and priority disable receiver and suspending logic means for receiving said true state of said signal allowing ownership to be retained, said PRIORITY DISABLE signal, and responsively to the duration thereof both suspending that notification of the winning of arbitration in ownership of said bus should be given to an associated said bus User device, and for also suspending that said bus interface logic circuit and said associated bus User device should, either one, be enabled to transfer data upon said bus.

7. In a digital communication system including a digital communication bus and a plurality of bus User devices communicably interconnected to said bus by a like plurality of bus interface logic circuits, an improvement to said bus interface logic circuit according said associated bus User device the ability to both initiate the request, and retract the request previously initiated, which request does cause said bus interface logic circuit to engage in arbitration for ownership of said digital communication bus on behalf of said associated bus User device, said improvement to the apparatus of said bus interface logic circuit according that said request to engage in arbitration should be both initiatable and retractable by said associated bus User device comprising:

request flip-flop logic means responsive to a first, initiate, signal from said associated bus User device for registering a request to arbitrate said digital communication bus by setting, and responsive to a second, retract signal from said associated bus User device for deregistering any request to arbitrate said digital communication bus by clearing; and arbitration logic means responsive to said request flip-flop logic means which is enabled to communicate control signals to said bus for arbitrating for ownership of said digital communication bus when said request flip-flop logic means is in one state, and which is disabled when said request flip-flop logic means is in its other state;

whereby said arbitrating amongst and between said like plurality of bus interface logic circuits, which arbitrating is thus distributed amongst and between said bus interface logic circuits, is enabled or disabled to be engaged in by said arbitration logic means within and at each one of said bus interface logic circuits by said set or said clear condition of said request flip-flop logic means and at each said one of said bus interface logic circuits;

whereby the process of arbitration which is distributed is, nonetheless to said distribution, not only enterable but also exitable at each one of said bus interface logic circuits.

8. The improvement to the apparatus of a bus interface logic circuit of claim 7 wherein said arbitration logic means further comprises:

arbitration logic means for arbitrating amongst and betweenst said plurality of bus interface logic circuits of number M on a plurality of number M-1 of arbitration signal lines upon said bus wherein each said plurality of bus interface logic circuits save one does drive a unique associated one of said plurality of bus interface logic circuits and does not drive any of said plurality of said arbitration signal lines, and wherein all said plurality of said bus interface logic circuits receive signals from all of said plurality of arbitration signal lines.

9. In a digital communication system including a digital communication bus and a plurality of bus User devices communicably interconnected to said bus by a like plurality of bus interface logic circuits, an improvement to said bus interface logic circuit in order to cause said bus interface logic circuit to constantly and continuously arbitrate for ownership of said bus while simultaneously preventing said bus interface logic circuit from notifying said associated one of said plurality of bus User devices, and also preventing the transmission of information until such time that said bus interface wins arbitration for ownership of said bus, said improvement to the apparatus of said bus interface logic circuit to the end that is should continuously arbitrate but not act upon the winning of arbitration comprising:

arbitration logic means responsive to an external signal, called STOP BUS, to constantly and continuously arbitrate for ownership of said bus regardless of whether said associated one of said plurality of bus User devices has directed entrance into arbitration and regardless of whether arbitration is, at a time or times, won;

inhibiting-of-bus-granted logic means responsive to said external signal for causing that said associated one of said plurality of bus User devices will not be notified of the winning of arbitration by a signal arising at said arbitration logic means upon any of said time or times at which arbitration is won; and inhibiting-of-further-information-transmission logic means responsive to said external signal for causing that no transmission of any information such as data will occur responsively to, and upon, said time or times at which arbitration is won;

whereby said bus interface logic circuit is caused, responsively to said external signal, to continuously arbitrate for ownership of said bus, while also being caused not to act to notify said associated one of said plurality of bus User devices, and also not to act to transmit information upon the winning of arbitration;

whereby when that said bus interface logic circuit caused, responsively to said external signal, to continuously arbitrate for said bus but not to act upon the winning of arbitration is the single highest priority one bus interface logic circuit of all said plurality of bus interface logic circuits as may at times arbitrate, then said continuously arbitrating single highest priority one bus interface logic circuit will continuously win arbitration but will not act upon the winning of arbitration, which occurrence will stop the use of the bus by any and all bus User devices for the transmission of any information such as data.

10. Upon a digital communications bus interconnecting a multiplicity of bus User devices each interconnected to said bus through like bus interface logics, an improved method of conducting distributed arbitration for ownership of said bus amongst and betweenst said bus User devices to the end that each User device may temporarily inhibit any new, previously uncommenced, entrance into said distributed arbitration of other bus interconnected said User devices, said method comprising:

a first one of said multiplicity of bus User devices does firstly enter into distributed arbitration for ownership of said bus by causing the associated one said bus interface logics to raise an associated one REQUEST signal upon an associated one line thereof of said bus for the purpose of participating in said arbitration as a bus User device desiring ownership thereof of said bus; and at some time during the continuing maintenance of said one REQUEST signal, which signal does persist until said first one of said multiplicity of bus User devices does win said distributed arbitration, said first one of said multiplicity of bus User devices does also cause said associated one of said bus interface logics to raise a REQUEST INHIBIT signal on a dedicated one signal line thereof of said bus; then at least a one or ones of said bus interface logics as are associated with second one or ones of said multiplicity of bus User devices does (do) sense said raised REQUEST INHIBIT signal and, responsively thereto during the duration of said raised REQUEST INHIBIT signal, does (do) preclude that said associated second one or ones of said multiplicity of bus User devices is (are) able to firstly, meaning newly, enter into said distributed arbitration; then said first one of said multiplicity of bus User devices which did cause said associated one of said bus interface logics to raise said REQUEST INHIBIT signal does eventually, in priority order, win arbitration and, responsively thereto, said associated one of said bus interface logics does lower said REQUEST INHIBIT signal;

wherein the effect of said first one of said multiplicity of bus User devices in causing said raising of said REQUEST INHIBIT signal was to suspend during the duration of said REQUEST INHIBIT signal the new entrance into said distributed arbitration of said second one or ones of said multiplicity of bus User devices as was (were) not already participatory therein;

wherein IF all ones of said bus interface logics which are associated with all ones of said multiplicity of bus User devices, including said first one of said multiplicity of bus User devices, do sense said raised REQUEST INHIBIT signal during the duration thereof, and do responsively thereto preclude that each associated one of said multiplicity of bus User devices should firstly, enter into said distributed arbitration, THEN during the duration of said raised REQUEST INHIBIT signal identities and numbers of all said multiplicity of bus User devices which are participating in said distributed arbitration will not be subject to augmentation by the new entrance into said distributed arbitration of any one or ones of said multiplicity of bus User devices which were not, previously to the raising of said REQUEST INHIBIT signal, already participating therein said distributed arbitration, ELSE if not all of said ones of said bus interface logics do not sense said raised REQUEST INHIBIT signal then at least some of said multiplicity of bus User devices will be able, during the duration of said raised REQUEST INHIBIT signal, to newly enter into said distributed arbitration.

11. The method allowing each User device to temporarily inhibit any new entrance into distributed arbitration of other bus interconnected User devices of claim 10 which further comprises:

responsively to the duration of an external signal, called UNIT IS IMMUNE TO REQUEST INHIBIT, received at least at one or ones of said bus interface logics which are associated with third one or ones of said multiplicity of bus User devices, making immune said one or ones of said bus interface logics as are associated with said third one or ones of said multiplicity of bus User devices to said raised REQUEST INHIBIT signal, immune meaning that said raised REQUEST INHIBIT signal will not preclude that said associated third one or ones of said multiplicity of bus User devices should be able to firstly, meaning newly, enter into said distributed arbitration;

whereby said at least one of said bus interface logics as is associated with said second one or ones of said multiplicity of bus User devices does preclude, responsively to said raised REQUEST INHIBIT signal, that said associated second one or ones of said multiplicity of bus User devices should firstly enter into said distributed arbitration, while said at least one or ones of said bus interface logics as are associated with said third one or ones of said multiplicity of bus User devices and which do receive said external signal UNIT IS IMMUNE TO REQUEST INHIBIT do not preclude, responsively to said raised REQUEST INHIBIT signal, that said associated third one or ones of said multiplicity of bus User devices should firstly enter into distribution arbitration.

12. The method allowing each User device to temporarily inhibit any new entrance into distributed arbitration of other bus interconnected User devices of claim 11 which further comprises:

upon said time as said first one of said multiplicity of User devices does win said distributed arbitration, gating a further true signal call PRIORITY DISABLE from said first one of said multiplicity of bus User devices, and driving from said associated first one of said bus interface logics said true signal called PRIORITY DISABLE upon said bus for so long as, by the true condition of said signal called PRIORITY DISABLE, said first one of said multiplicity of User devices does indicate that it desires to retain said bus which it did win and that any new winner of said distributed arbitration should be suspended from assuming ownership of said bus; and responsively to the duration of said true condition of said signal called PRIORITY DISABLE received upon said bus, upon the next time subsequent to said time wherein all said bus interface logics as are associated with all said bus User devices do conduct a next distributed arbitration, the new winning bus User device thereof of said next distributed arbitration is suspended from receiving notification of winning ownership of said bus, and also suspended is any ability of said new winning bus User device to next transfer data upon said bus wherein by said suspended notification, and by said suspended ability of said new winning bus User device, then said first one of said multiplicity of bus User devices does retain ownership of said bus.

* * * * *